April 6, 1926. 1,579,757
J. ERICKSON
AUTOMATIC ELECTRICAL SWITCHING MEANS
Filed March 10, 1905 9 Sheets-Sheet 3

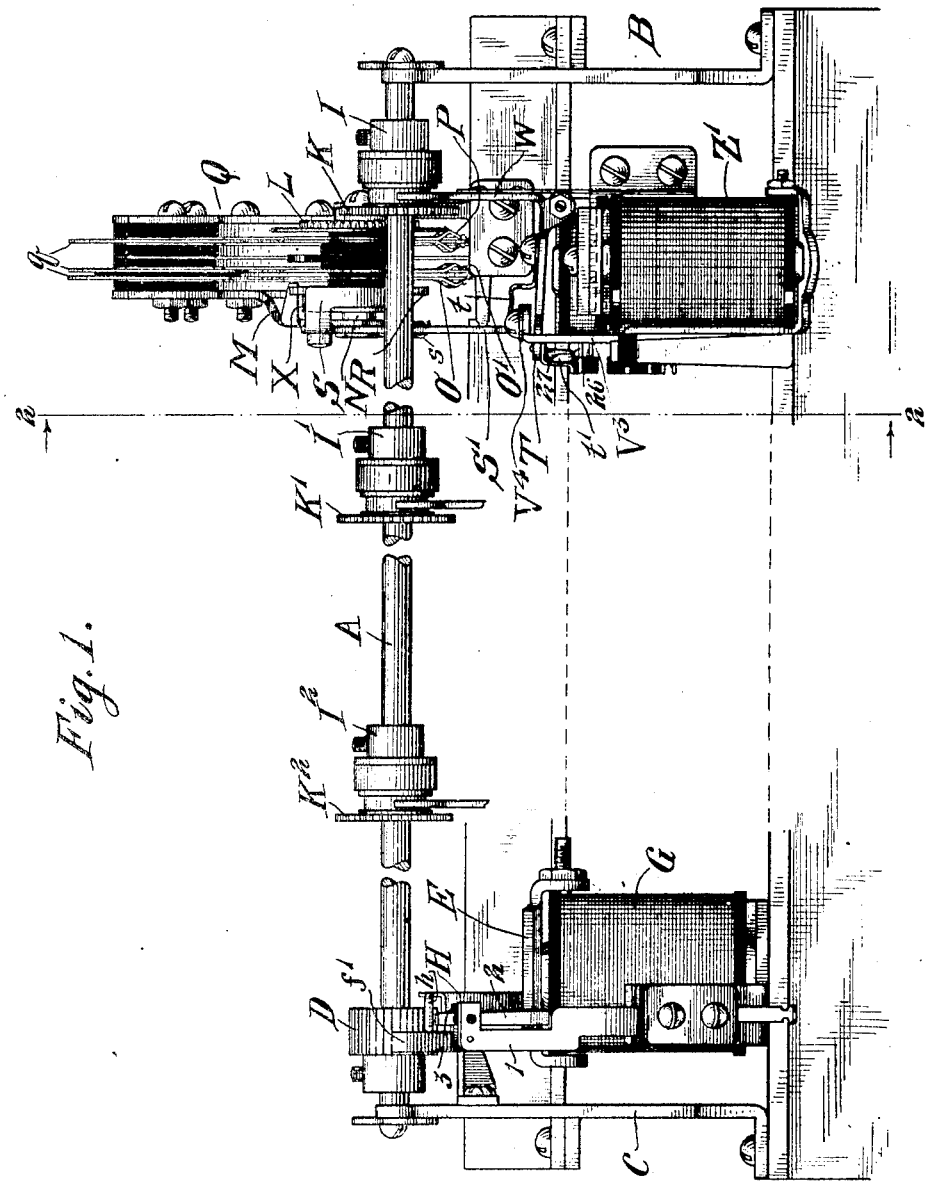

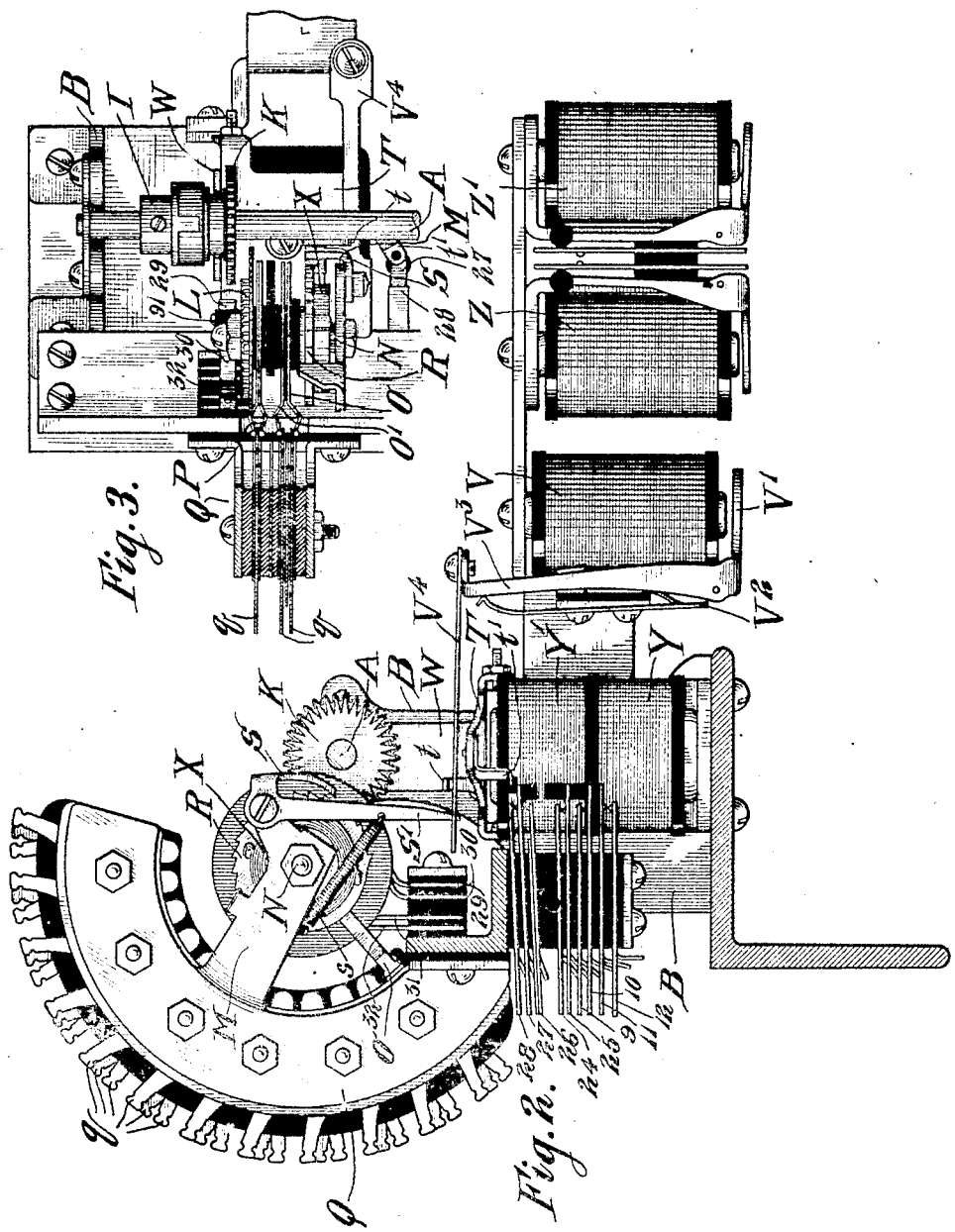

Witnesses.
R. H. Burfind
A. Andersen.

Inventor:
John Erickson
By Bulkley & Durand
Attorneys.

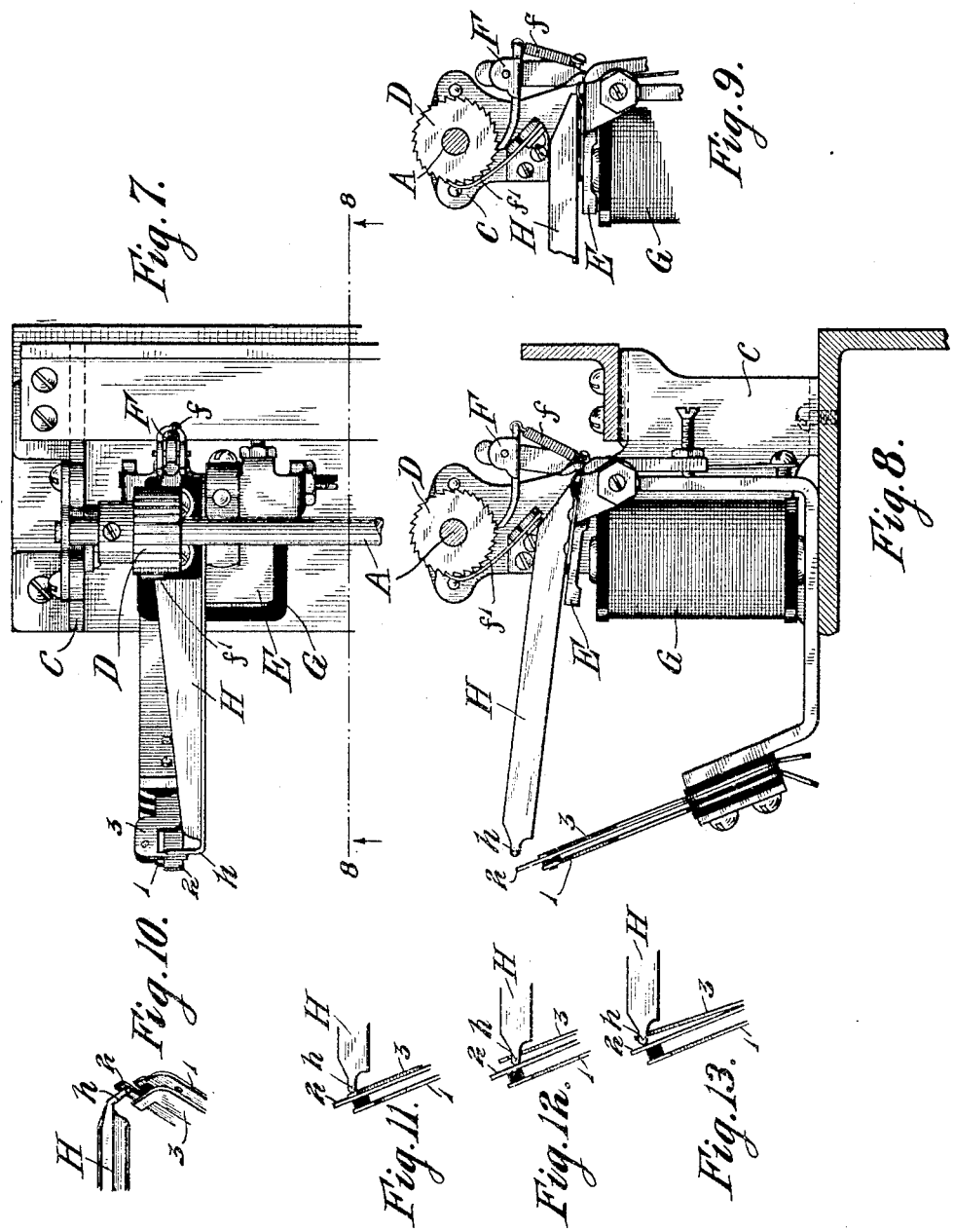

April 6, 1926. 1,579,757
J. ERICKSON
AUTOMATIC ELECTRICAL SWITCHING MEANS
Filed March 10, 1905 9 Sheets-Sheet 5

Witnesses.
Inventor:
John Erickson
By Bulkley & Durand
Attorneys.

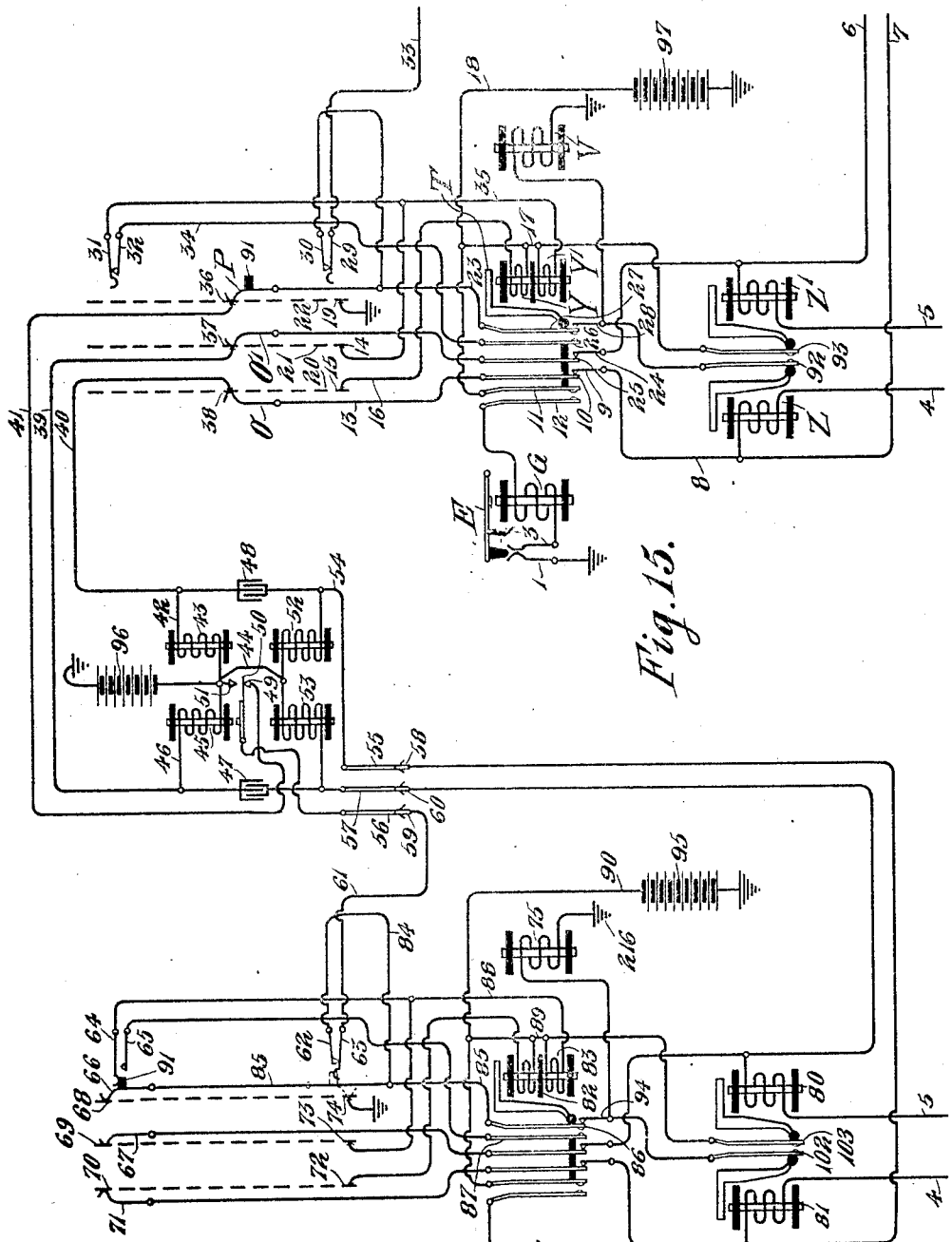

April 6, 1926.
J. ERICKSON
1,579,757
AUTOMATIC ELECTRICAL SWITCHING MEANS
Filed March 10, 1905
9 Sheets-Sheet 7
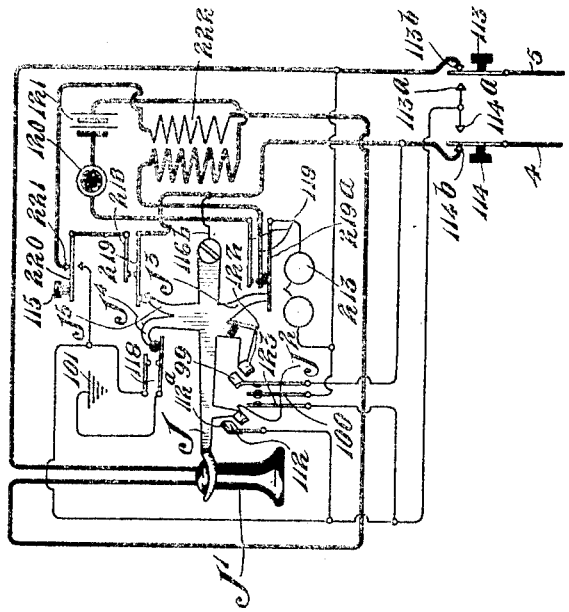
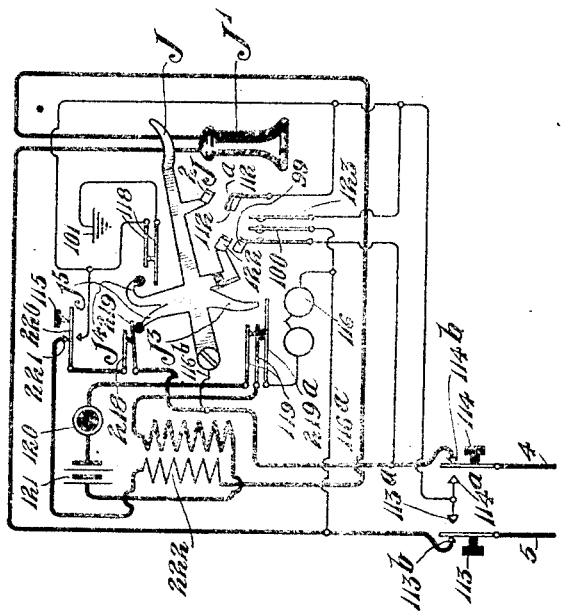
Witnesses.
Inventor:
John Erickson
By Bulkley + Durand
Attorneys.

Patented Apr. 6, 1926.

1,579,757

UNITED STATES PATENT OFFICE.

JOHN ERICKSON, OF CHICAGO, ILLINOIS, ASSIGNOR, BY MESNE ASSIGNMENTS, TO AUTOMATIC ELECTRIC INC., OF CHICAGO, ILLINOIS, A CORPORATION OF DELAWARE.

AUTOMATIC ELECTRICAL SWITCHING MEANS.

Application filed March 10, 1905. Serial No. 249,499.

*To all whom it may concern:*

Be it known that I, JOHN ERICKSON, a citizen of the United States of America, and resident of Chicago, Cook County, Illinois, have invented a certain new and useful Improvement in Automatic Electrical Switching Means, of which the following is a specification.

My invention relates more particularly to automatic telephone systems of that character in which electrical switches operating on the step-by-step principle are employed, in place of switchboard operators, for establishing connection between the lines of different subscribers, and in which each subscriber is provided, not only with the usual or any suitable telephone instruments, but also with a switching device for sending or transmitting electrical impulses over the line, in accordance with the character of the number which the subscriber is calling, and for the purpose of operating one or more of the step-by-step switches at the central station, thereby establishing electrical connection between the terminals of the lines of the calling and called subscribers.

Generally stated, the object of my invention is the provision of an improved construction and arrangement of the primary or first switches of the system—that is to say, the switches, which are each individual to a subscriber's line, and one of which each calling subscriber must operate first, prior to calling the number of the desired subscriber, in the general operation of establishing connection between the two subscribers' lines—and to thereby reduce the number of so-called first "selectors" or switches which receive and are operated by the impulse or impulses representing the first digit of the called number, and whereby the total number of switches to be operated by impulses representing the different digits of any called number may be considerably less than the total number of subscribers, the only switches each of which is individual to a single subscriber, and each of which is used exclusively by its allotted subscriber, consisting of automatic step-by-step switching devices each adapted to be operated by an impulse sent over its allotted subscriber's line, by the calling subscriber, preliminary to actually calling the desired number.

A special object is the provision of an improved construction and arrangement by which any suitable or desired number of said "individual-switches", say one hundred, may be associated together and each connected with its allotted subscriber's line, and combined with a single step-by-step mechanism or switch-actuating machine which is common to all of the said "individual-switches" in the particular group to which the same is allotted, and whereby, as is obvious, the said "individual-switching" devices, although corresponding in number to the total number of subscribers, are operated by step-by-step mechanisms or master-switches considerably less in number than the total number of subscribers, the electro-magnet which operates each step-by-step mechanism, and which is allotted to a group of the said "individual-switches", being common to the subscribers whose lines terminate in switching-contacts of the said group of "individual-switches".

Another object is the provision of an improved construction and arrangement whereby a single rotary shaft, actuated by a single step-by-step mechanism, may be employed for operating the switch-contacts of all of the "individual-switches" in the group to which such step-by-step mechanism and shaft are allotted.

A further object is the provision of an improved construction and arrangement by which each "individual-switch" is normally and mechanically disconnected from the said shaft, and consequently from the step-by-step mechanism or master-switch, so that any subscriber is free to use the said step-by-step mechanism and shaft for operating his particular switch without operating or disturbing any of the other switches in the same group, and whereby the preliminary impulse transmitted over the line of the calling subscriber, by any suitable means, accomplishes two things,—to-wit, the closing of the normally-open mechanical connection between the said shaft and the calling subscriber's switch, and the actuation of the step-by-step mechanism in such manner as to rotate the shaft until the switching device or "individual-switch" allotted to the calling subscriber automatically picks out an idle trunk-line leading to a switch in a group of switches, such as first "selectors" or "connectors", or other switches which are operated only by number impulses, according to the size and general character of the system.

Another object is the provision of an arrangement whereby the called subscriber, in answering a call, transmits the usual preliminary impulse resulting, for example, from taking down the receiver, but whereby this preliminary impulse, when thus transmitted by the called subscriber, does not cause the "individual-switch" of the called subscriber to operate in the usual manner, but simply causes it to rotate or move to the full extent or limit of its operation, without stopping on any of the idle trunk-lines, and merely for the purpose of opening up or cutting off a bridge normally existing across the called subscriber's line, such, for example, as the bridge in which is located the electro-magnet for controlling the normally-open mechanical connection between the shaft and the "individual-switching" device of the called subscriber.

It is also an object, of course, to provide certain details and features of construction, either mechanical or electrical, tending to increase the general efficiency and serviceability of an automatic telephone system.

To the foregoing and other useful ends, my invention consists in matters hereinafter set forth and claimed.

As herein shown and described each individual-switch is used by its allotted subscriber and no other; is only used to select a trunk-line when the subscriber calls, and not when he is called.

In the accompanying drawings, Figure 1 is a front elevation of an "individual-switching" apparatus embodying the principles of my invention, one complete "individual-switch" being shown, together with the shaft which is common to any suitable number of such switches, and the step-by-step mechanism, or shaft-operating device, which is also common to all the "individual-switches" in the group.

Fig. 2 is a vertical cross-section on line 2—2 in Fig. 1.

Fig. 3 is a plan of a portion of the mechanism shown in Fig. 2, showing the bank of switch-contacts in horizontal section.

Fig. 7 is a plan of the step-by-step mechanism shown at the left in Fig. 1.

Fig. 8 is a vertical cross-section on line 8—8 in Fig. 7.

Fig. 9 is a detail of the step-by-step mechanism, showing the armature thereof in its attracted position.

Figs. 10 to 13, inclusive, are detail views illustrating the mode of operation and different positions of the interrupter-switch—that is to say, the switch which is automatically operated by the "rotary-magnet" for alternately opening and closing its own circuit, so as to automatically continue the step-by-step rotation of the shaft until an idle trunk-line is picked out by the calling subscriber's "individual-switch", the action of this "rotary-magnet" being discontinued, automatically, as soon as the wipers or switch-arms of the said "individual-switch" are brought into engagement with the bank-contacts corresponding to an idle trunk-line.

Figure 14:
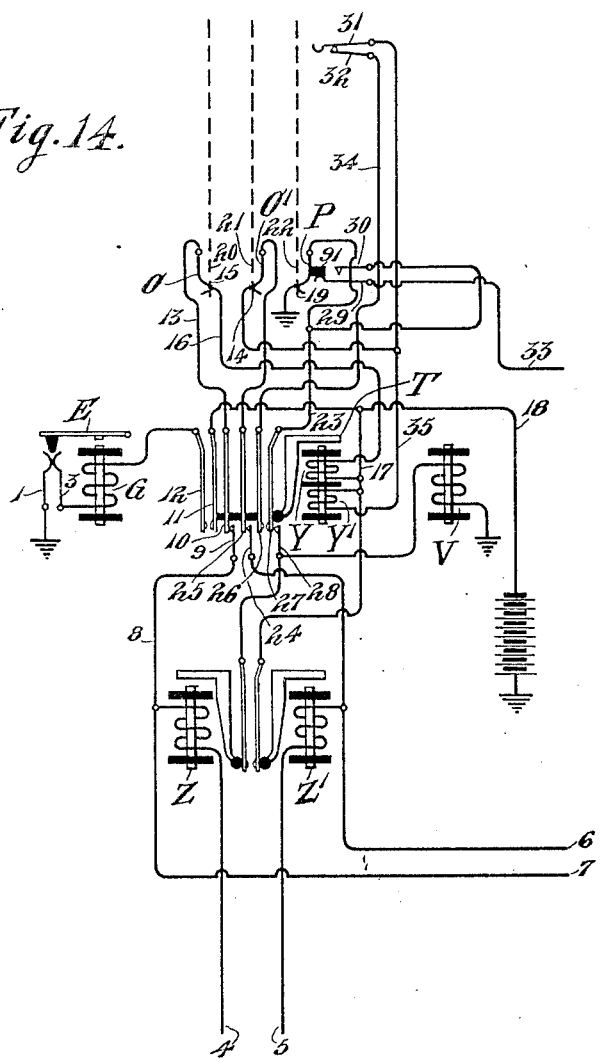

Fig. 14 is a diagram of the circuits of the electro-magnets and switching-contacts shown in Fig. 1, the apparatus being shown in its normal or at rest position.

Fig. 15 is a diagram showing two of the "individual-switches", of the character shown in Fig. 14, connected up through the medium of a so-called "connector-switch", the connection being thus established between the two subscribers' lines shown at the bottom of the figure, the calling subscriber's switch being shown in condition to retain the connection between the two lines, but the called subscriber's switch being out of use, so to speak, and only so operated as to remove the coils normally bridged across the called subscriber's line, as will hereinafter more fully appear.

Figs. 16 and 17 show, diagrammatically, the subscribers' telephones and switching apparatus.

Figure 18:
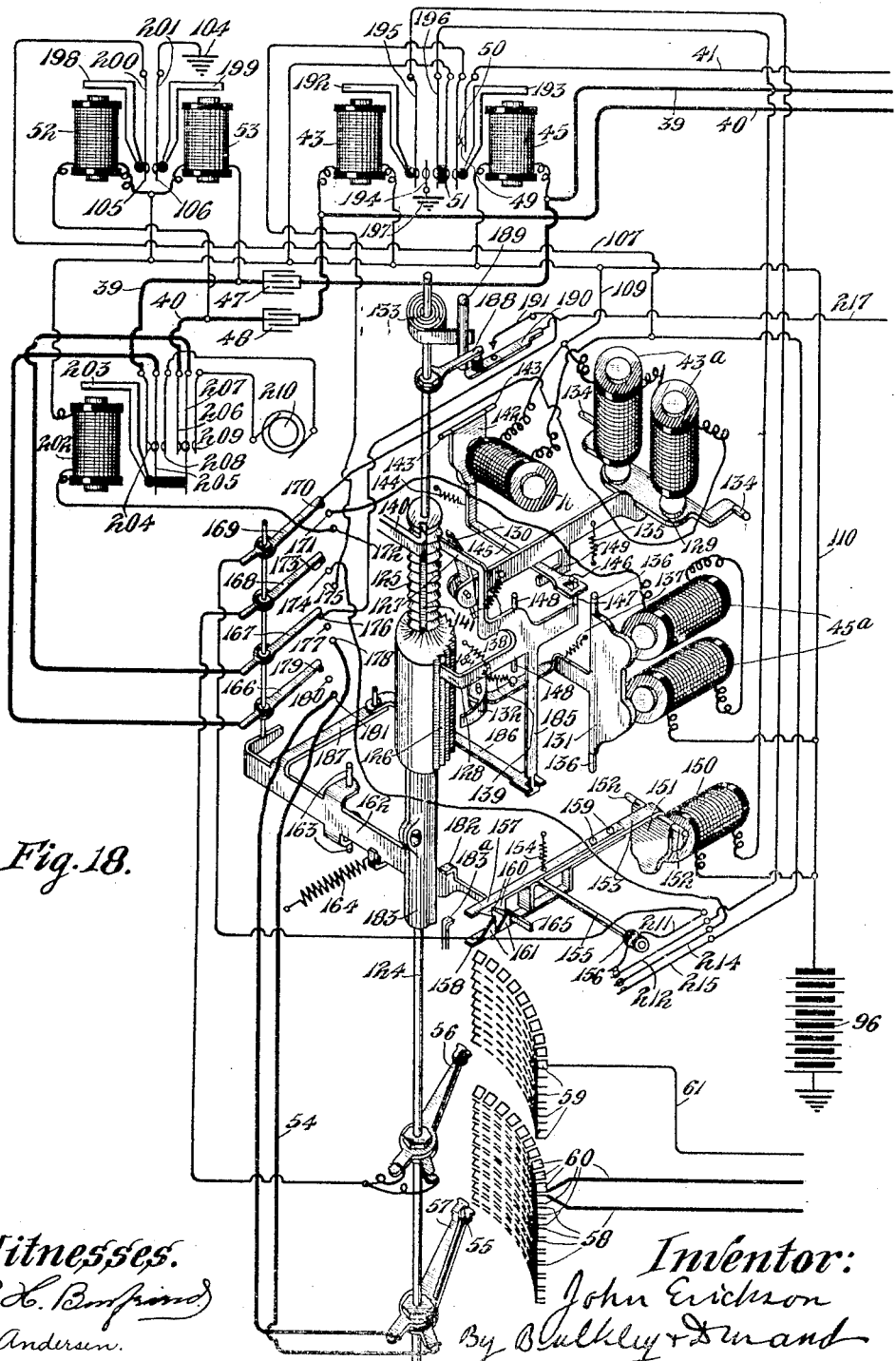

Fig. 18 is a diagrammatic view illustrating both the circuits and the mechanical operating connections of the "connector-switch."

Figure 19:
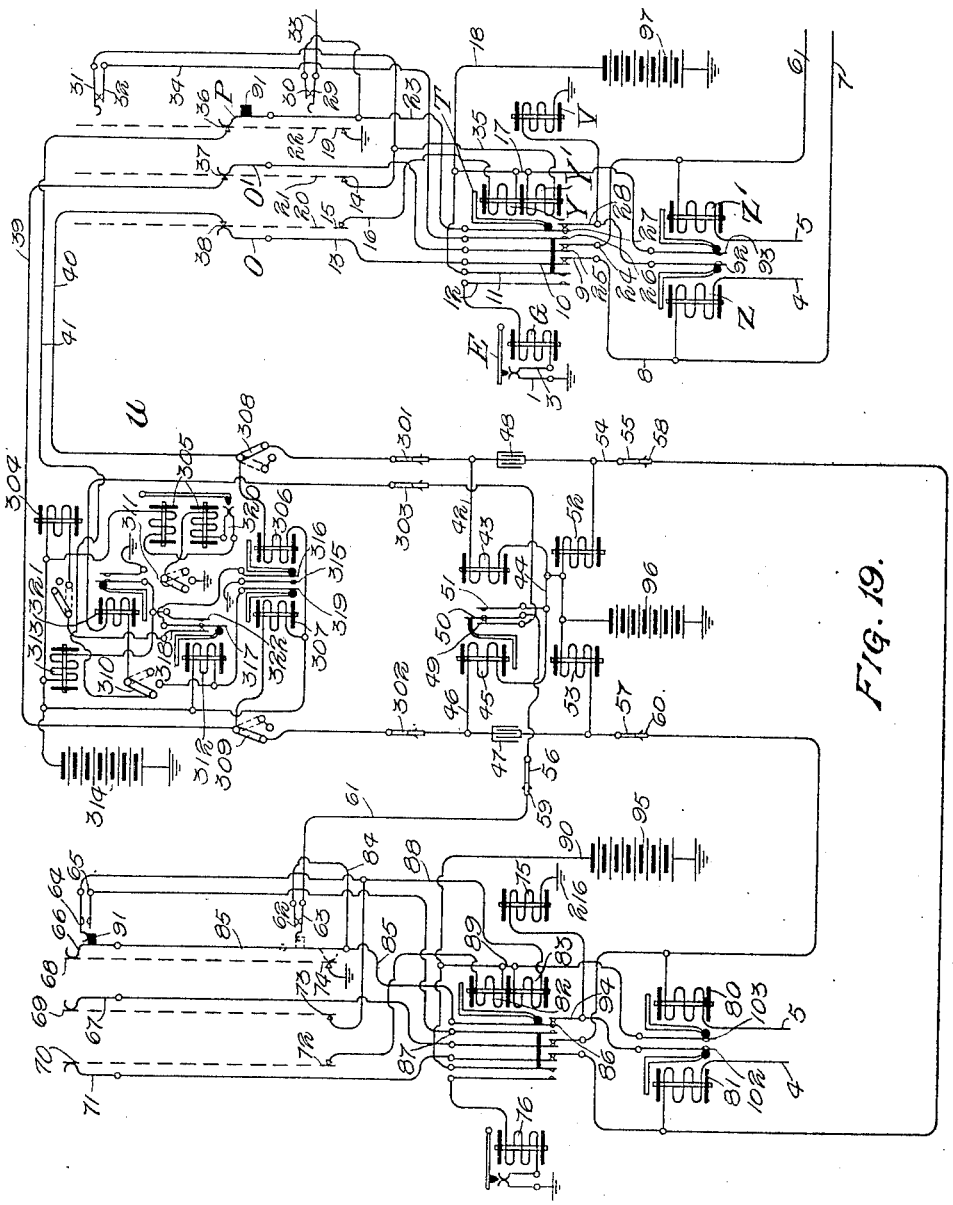

Fig. 19 is a diagram showing two of the individual switches of the character shown in Fig. 14 connected up through the medium of a selector switch and a connector switch. Fig. 19 is the same as Fig. 15 except that the selector U is included between the individual switch of the calling line and the connector.

As thus illustrated, the general mode of operation is as follows: The calling subscriber, in removing his receiver from the switch-hook, or in some other suitable manner, transmits a preliminary impulse over the line—that is to say, an impulse which traverses the line preliminary to calling the number of the desired subscriber. This preliminary impulse sets the switching apparatus in operation, but only to this extent, that the normally-disconnected switching device allotted to the calling subscriber is instantly connected with the switch-shaft, and the said shaft then actuated by the step-by-step mechanism which is common to all the "individual-switches" in this particular group. The said step-by-step mechanism rotates the shaft which is common to all the "individual-switches," and does so until the wipers or switch-arms of the calling subscriber's switch pick out and engage the contacts corresponding to the first idle trunk-line encountered in the path of travel traversed by said wipers or switch-arms. This is done, however, without in any way operating or disturbing any of the other "individual-switches" distributed along the length of said shaft; and in this way, each subscriber of this particular group is free to use the step-by-step mechanism and the shaft for the purpose of operating his particular switch, provided, of course, that the said mechanism is not already in use; and as soon as such mechanism and the shaft have served the purpose of the calling subscriber—that is to say, as soon as the calling subscriber's "individual-switch" has been operated in such manner as to pick out an idle trunk-line, the switch thus in use is then automatically disconnected from the shaft, and consequently from the step-by-step mechanism. Thus, the step-by-step mechanism and the shaft, as soon as the necessary work is performed, resume their normal condition, and remain in readiness for use by another subscriber. Consequently, the switch-operating means, or the switch-operating machine, so to speak, is common to a plurality of primary or first switches—that is to say, switches, any one of which is available by its allotted subscriber for establishing connection directly from his line to a trunk-line. The arrangement, therefore, comprises a plurality of switches and a switch-operating machine or device which is common to all of said switches, and which may be used by any one of the subscribers in the group to which the said machine or device is allotted for operating one of said switches; and one of the distinguishing features of my invention resides in the fact that the said switch-operating machine or device, after operating or bringing about the operation of one of said switches, and while such switch is in use, is then available for use by some other subscriber. Obviously, the connection between the switch-operating machine or device and the different switches may be either electrical or mechanical, it being possible, of course, to electrically connect the switch-operating machine or device with a plurality of switches; but in the present case, the different switches are shown as having only mechanical connections with the switch-operating machine or device.

Figure 5:
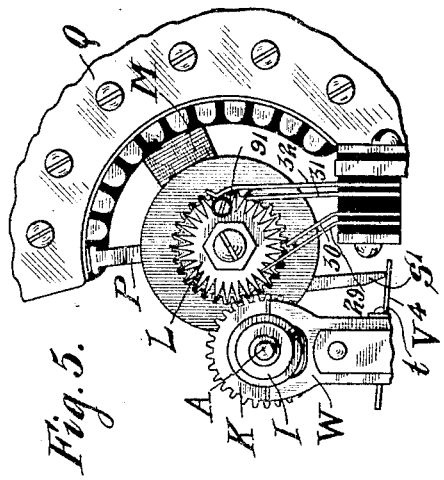
Fig. 5 shows a portion of the mechanism in Fig. 4, but in a different position.
Figure 6:
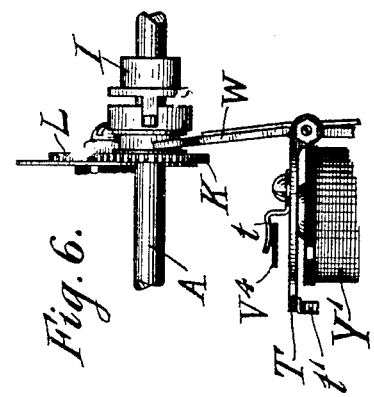
Fig. 6 is a detail of the normally-open gear connection between the shaft and one of the "individual-switches", and showing the electro-magnet and its armature for opening and closing such connection.
Figure 4:
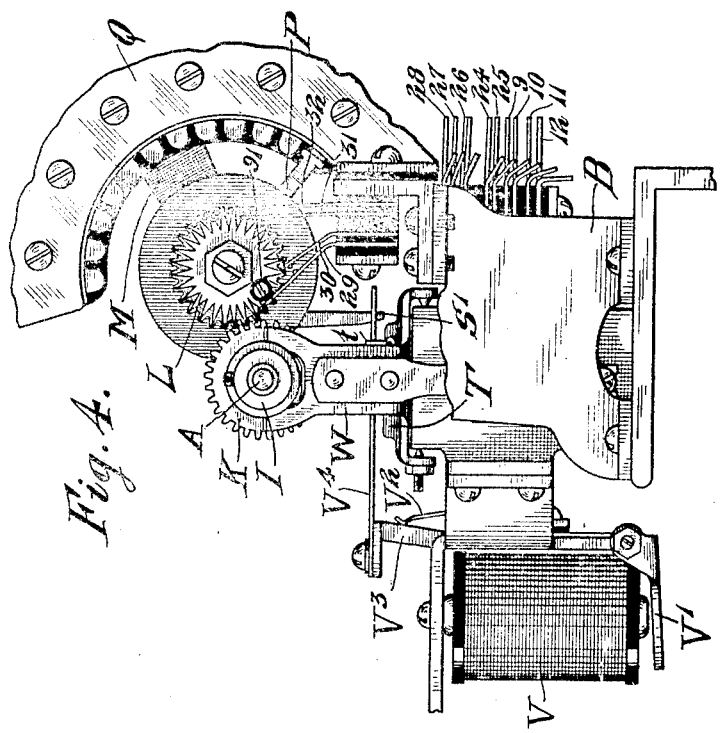
Fig. 4 is an end elevation of the devices shown in Fig. 3.

Briefly described, the construction of the switches and apparatus are as follows: Referring to Fig. 1, it will be seen that the horizontally-disposed shaft A is free to revolve in two bearings or supports B and C which are located at the opposite ends of the shaft. When it is to be used for operating one of the switches distributed along its length, the said shaft is rotated by the step-by-step or ratchet mechanism shown at the left of Fig. 1. As illustrated in Fig. 8, the ratchet-wheel D is actuated by the pawl F, the latter being carried by the armature E of the so-called "rotary-magnet" G. It will be understood that this "rotary-magnet" G may be of the regular style or character, or of any suitable or desired construction; but, as shown, it is provided with the usual circuit-breaker-arm H, or interrupter-arm, as it is sometimes called, and with a set of circuit-breaker or interrupting springs 1, 2 and 3 for alternately opening and closing its own circuit, and thus giving the armature the well-known vibratory or buzzer action. Preferably, this shaft A, its said step-by-step mechanism and "rotary-magnet" shown at the left of Fig. 1, are common to a group of subscribers' lines, as, for example, one hundred lines running from the exchange or central station to a similar number of subscribers or sub-stations. In this way, the mechanism shown at the right of Fig. 1 is individual to a single subscriber, as are also the other switches distributed along the length of the shaft, while the mechanism shown at the left of Fig. 1 is common to the entire number of subscribers in this particular group; and consequently each subscriber's line of the group terminates in a switch or switching apparatus like the one shown at the right of Fig. 1, and of the character shown in detail in Figs. 2 to 13, inclusive. Any suitable arrangement or devices can be employed as a medium for transmitting connection between the shaft and the different switches located at intervals along its length; but as a simple and effective arrangement, said shaft is provided with a fixed hub or collar I, and with a sliding gear-wheel K having a spline or feather-like connection, so to speak, with the said hub, as shown more clearly in Fig. 6; and with this arrangement, both the hub and the gear-wheel will always rotate when the shaft rotates, and in unison therewith, but at the same time the said gear-wheel can be shifted axially along the said shaft. In connection with this feature of the mechanism, it may be stated that the hubs I¹, I² and the gear-wheels K¹, K², shown at intermediate points on the shaft, serve to illustrate how other switching devices, or "individual-switches," may be arranged side by side on this same shaft. For example, if this switch-operating machine is to be used in common by a group of one hundred subscribers, then this shaft will be of such length as to permit one hundred of these hubs and gear-wheels, with the accompanying switching devices, such as shown at the right in Fig. 1, to be mounted side by side on the said shaft. It is for this reason, and owing to the fact that each of these switching devices is used by a single subscriber, and by that subscriber only, that the said switches are termed "individual-switches." The construction of each "individual-switch" includes a gear-wheel L; and it will be seen that this gear-wheel revolves on the short shaft N which is carried by the support M (Fig. 3). This shaft, in addition to carrying the gear-wheel L, also carries three wipers or switch-arms O, $O^1$ and P, which latter are rigidly secured to but insulated from the gear-wheel L and which are adapted and arranged to be moved over the bank Q. This bank Q may consist of twelve sets of contact-teeth clamped together and supported as shown in the drawings; it being observed that the said contacts are arranged in semi-circular rows, so that the said wipers or switch-arms, when operated, swing around and move from one bank-contact to the other, thus traversing an arc of a circle. In addition, the said short shaft also carries a ratchet-wheel R which is used, as will hereinafter more fully appear, in locking the said wipers against back rotation as they are moved about and given a step-by-step motion over the bank-contacts. As illustrated in Fig. 2, this locking is done by means of the dog S, which is adapted to engage the teeth of the said ratchet-wheel. The step-by-step motion is transmitted to the gear-wheel L on the short shaft of the "individual-switch" from the gear-wheel K on the shaft of the switch-operating machine, whenever the armature T is attracted. Obviously, this armature T (Figs. 1 and 3), each time it is pulled down, causes its arm W to be pressed forward against the gear-wheel K, which latter is free to slide along the shaft A to an extent sufficient to enable it to mesh with the gear-wheel L; but, as shown in detail in Fig. 6, the hub of this gear-wheel still meshes or engages with the hub I, which is clamped to the shaft A. In this way, the movements of the said shaft are transmitted from the hub I through the gear-wheel K to the gear-wheel L and thence to the wipers or switch-arms O and P. The "release-magnet" V (Fig. 2) is employed, as will hereinafter more fully appear, for releasing the mechanism after the conversation between the two subscribers has been terminated. Normally, the armature $V^1$ of this "release-magnet" is held away from the pole-piece by the spring $V^2$. Also, as shown, the said armature $V^1$ carries, at the end of the arm $V^3$, a spring $V^4$; and with this arrangement, and whenever the armature $V^1$ is attracted, the spring $V^4$ is given an endwise movement which allows the arm $S^1$, attached to the pawl S, to drop into a hole or recess in the end of the spring $V^4$, so that as the armature $V^1$ returns to its normal position, the pawl S is drawn out of engagement with the ratchet-wheel R, and the wipers O and P thereby allowed to return to their normal positions under the influence of a clock-spring X. The relays Z and $Z^1$ may be the ordinary "vertical" and "rotary" line-relays of the subscriber's line.

The operation of the apparatus is as follows: Referring to Fig. 14, the line-conductors 4 and 5 come from the subscriber's station, at which is located the subscriber's telephone instruments, together with the subscriber's switching apparatus or impulse-sending device for operating the step-by-step switches; and at the subscriber's station it will be understood that the apparatus may also include any suitable arrangement for throwing the ringing current onto the line-circuits after the desired connection has been established between the calling and the called subscribers' lines. As shown in Fig. 16, however, there is a special requirement with respect to the apparatus employed at the subscriber's station—that is to say, it should be so constructed that, as the receiver is moved from the hook J, allowing the latter to rise, one of the lines will be momentarily connected to ground during the upward motion of the said switch-hook. This, of course, will cause a preliminary impulse to be sent over the line thus momentarily connected to ground; and it is by this preliminary impulse—that is to say, an impulse transmitted preliminary to the transmission of the impulses representing the digits of the called number—that the "individual-switch", connected with the subscriber's line at the central station, is operated and given time to select an idle or non-busy trunk-line or other connection before the calling subscriber begins sending the impulses which represent the different digits of the called number, and which may therefore be termed "number" impulses as distinguished from the said preliminary impulses. The conductors 6 and 7 are the so-called normals of the calling subscriber's "individual-switch", and terminate, of course, in multiple-contacts of the banks of the proper "connector-switches". As illustrated, Y and $Y^1$ represent the two windings of the magnet which attracts the armature T, it being borne in mind that it is the latter which presses the main shaft gear-wheel into engagement with the gear-wheel L of the "individual-switch". Suppose, now, that the subscriber at the subscriber's station at which the line-conductors 4 and 5 terminate wishes to make a call. In such case, he first removes his receiver $J^1$ from the hook J, and then proceeds to operate the switching device for sending the "number" impulses, it being understood, of course, that the said switching device may be of any suitable, known or approved character. By the upward motion of the switch-hook, one of the line-conductors, for example, the line-conductor 4, is momentarily connected to ground at J², thus energizing the magnet-coil Y over the following circuit: from ground through line-conductor 4, relay-coil Z, conductor 8, contact-spring 9, contact-spring 10, conductor 13, wiper O, bank-contact 15, conductor 16, magnet-coil Y, conductor 17, conductor 18 to battery and thence to ground, causing the magnet-coil Y to attract its armature. When the magnet-coil Y attracts its armature, the results are as follows: First, the spring V⁴ is pressed down, thus releasing the pawl S and leaving it free to engage the ratchet-wheel R; and then the gear-wheel K, on the main shaft of the switch-operating machine, is pressed into engagement with the gear-wheel L of the "individual-switch" connected with the line of the calling subscriber. Also, circuits are closed through the "rotary-magnet" G and its circuit-breaking springs 1 and 3, thereby starting the step-by-step mechanism, and causing the desired step-by-step rotary motion of the shaft. The said circuit thus closed through "rotary-magnet" G is from ground through contact-springs 1 and 3, magnet-coil G, contact-springs 12 and 11, conductor 18 to battery and thence to ground, thereby energizing the said "rotary-magnet", and causing the latter to attract its armature. This, of course—that is to say, the energizing of the "rotary-magnet"—causes the pawl F to engage the ratchet-wheel D, and with the result that the shaft A is rotated one tooth, or one step, so to speak. The shaft A, when thus given a partial rotation, causes the wipers O, O¹ and P to move a corresponding distance in their path of travel, and to move out of engagement with bank-contacts 15, 14 and 19, but into engagement with bank-contacts 20, 21 and 22.

If these contacts 20, 21 and 22 are not busy—not connected with a trunk-line or other connection used by another subscriber—the rotary motion will stop immediately, and the wipers will rest upon these contacts, thus connecting the line-conductors 4 and 5 through to the first trunk-line leading to another or auxiliary automatic switch, such, for example, as a first "selector-switch", or a "connector-switch", according to the size and general character and arrangement of the exchange. When the wiper O moves from contact 15, the circuit from ground at the calling subscriber's telephone, through the magnet-coil Y, previously described, is broken. Consequently, unless the "private-wiper" P should be moved onto a busy contact-point, the coil Y will no longer be energized, and will allow its armature to return to normal position, thus breaking the circuit already described through the "rotary-magnet" G, and also allowing the gear-wheel K of the main shaft to retire from engagement with the gear-wheel L of the "individual-switch" thus brought into use. Suppose, however, that the so-called "private-wiper" P should find the bank-contact 22 busy—that is, connected to ground at some point; in such case, a circuit will be established through the winding Y¹, thereby causing the magnet to remain energized, and to thereby retain its armature in an operated position. This being so, the rotary motion of the wipers will, of course, be kept up until the "private-wiper" P encounters a bank-contact which is not connected to ground, and therefore not busy. It will be readily understood that the continued operation of the step-by-step mechanism, in this manner, is due to the alternate opening and closing of the circuit through the "rotary-magnet" G, caused by the engagement of the interrupter-arm H with the springs 1, 2 and 3, as shown more clearly in Figs. 10 to 13, inclusive. This vibratory or buzzer action of the "rotary-magnet" has, however, been previously described, and is, furthermore, a feature old and well-known in the art. The circuit from the grounded or busy contact through the "private-wiper" P and the coil Y¹ keeps the "rotary-magnet" in operation until an idle trunk-line or other connection is found, and is as follows: from ground through contact-point 22, wiper P, conductor 23, contact-springs 27 and 26, conductor 34, springs 32 and 31, conductor 35, magnet-coil Y¹, conductors 17 and 18 to battery and thence to ground. When the wiper P reaches a contact, such, for example, as contact 36 (Fig. 15), which is not in use, then, as already explained, the winding Y¹ will no longer be energized, and will allow its armature to return to normal position, thus stopping the flow of current through the "rotary-magnet" G, and discontinuing the step-by-step rotary motion of the shaft A; and, in addition, complete the circuit from the line-conductors 4 and 5 through the "line-relays" Z, Z¹ and the "line-wipers" O, O¹ to the trunk-line conductors 40 and 39 leading to the "selector", "connector", or other switch which is not in use. As illustrated in Fig. 15, it is assumed that these trunk-line conductors lead through to a "connector-switch", such as shown in Fig. 18, and such as indicated at the top of Fig. 15; and that 43 and 45 designate the "vertical" and "rotary" "line-relays" of the said connector, and that 52 and 53 indicate the so-called "back-release-relays" of the said "connector-switch." The mechanical operating connections of the said "connector-switch" are shown, but need not be described; and the general arrangement of the circuits of this "connector" can be the same as those previously employed, but with one exception preferably, which is as follows: The "private-wiper" 56 of this "connector-switch", instead of being connected through ground when the "side-switch" is in third position, is connected to contact-points 50 and 49 with the third trunk-line conductor 41 leading back to the "individual-switch." This contact-point 50, and the two contact-points 51 and 49, have not heretofore been employed in switches of this character, but are herein described and shown as a desirable feature of such a "connector" when employed in conjunction with my improved "individual-switch" and my improved switch-operating machine, and in the circuit arrangement shown in Fig. 15; although it will, of course, be readily understood that any other suitable, known or approved releasing arrangement can be employed. The contact-points 59, 60 and 58, upon which the wipers 56, 57 and 55 of the "connector-switch" rest, are contacts in the "connector-banks" of the regular and well-known type, and may be selected by the "connector" step-by-step mechanism in the regular and well-known manner; and the operation of the "connector-switch" would, of course, be brought about by, and in accordance with, the "number" impulses transmitted over the "line-circuit" by the calling subscriber immediately after taking down his receiver, and subsequent to the establishment of connection between the calling subscriber's line and the trunk-line leading to the said "connector-switch." When the said "side-switch" of the "connector" has moved to third position, however, the well-known guarding potential on "private-bank-contact" 59, instead of being established through to ground in the customary way, will be brought about as a result of the establishment of a connection from ground through the following circuit: from "private-wiper" 56 through contact-point 50, contact-point 49, third trunk-line conductor 41, bank-contact 36, "private-wiper" P of the "individual-switch", conductor 23, contact-arms 27 and 28, and magnet-coil V to ground. As the coil V is preferably of very low resistance, this expedient will serve the desired purpose—that is to say, will practically amount to the same as having the "private-bank-contact" 59 connected directly with ground at the "connector-switch." It may be stated at this juncture, however, that when the "private-wiper" P stops on contact 36, a guarding potential is thereby established on all multiples of contact 36—that is to say, multiples of this contact in other switches—by means of the circuit just described, through coil V to ground, thus protecting all multiples of the contact 36 against seizure by any other "individual-switch." Furthermore, it will be seen that a guarding potential is also established in the "private-normal" 33 of the "individual-switch" through the coil V; and in this way, there is a circuit from "private-normal" 33 to contact-points 29 and 30, conductor 23, contact-arms 27 and 28, and through coil V to ground. Consequently, and as soon as the wipers of the "individual-switch" make their first rotary step, thus allowing springs 29 and 30 to make contact with each other, a guarding potential is established in "private-normal" 33; and this guarding potential will, of course, protect the line against seizure by any other subscriber. When the connection has been completed from the calling "individual-switch" through the "connector" to the normals of the called "individual-switch", then the called subscriber's bell will be rung in the customary manner by pressure of the button or other device at the calling subscriber's telephone. In this way, the ringing relay 202 of the "connector-switch" is operated, thus projecting alternating current onto the "line-normals" 58 and 60 of the called switch. All this, of course, involves the use of apparatus which is old in the art, and need not be described; but it will be sufficient to say that when the called subscriber removes his receiver from the switch-hook, the wipers of his "individual-switch" will immediately commence to rotate, in the same manner and for the same reason that the wipers of the calling subscriber's switch were brought into operation, and will not stop until they reach the last contacts 70, 69 and 68, as shown in Fig. 15. Obviously, the first step or partial rotation of the shaft will be made as a result of the impulse set up in the "line-circuit" of the called subscriber's telephone, and due to the upward movement of the called subscriber's switch-hook; and this impulse extends over one of the line-conductors, through coils 81 and 82 in series, thus energizing coil 82 and causing it to attract its armature, and thereby closing a circuit through the "rotary-magnet" 76 similar to that described through the "rotary-magnet" G of the calling "individual-switch." However, as soon as one rotary step has been made, then the circuit leading over the called subscriber's line from his telephone is broken; but at the same time springs 62 and 63 have been allowed to close together, so that the coil 83 will be energized through the following circuit: from ground to magnet-coil V of the calling "individual-switch", to contact-springs 28 and 27, conductor 23, wiper P, bank-contact 36, trunk-line conductor 41, contact-point 49, contact-arm 50, wiper 56, bank-contact 59, conductor 61, contact-arms 63 and 62, conductors 84 and 85, contact-arms 86, 87, 65 and 64, conductor 88, magnet-coil 83, conductors 89 and 90 to the opposite terminal of battery and thence to ground. In this way, magnet-coil 83 will be energized, causing its armature to be attracted, and thereby keeping the circuit through "rotary-magnet" 76 closed until the wipers reach the last set of contacts in the bank; and at this point in the operation, the insulating lug 91 presses against spring 64, and thereby breaks contact between this spring and the spring 65. As will be readily seen, the object of this rotary motion of the called subscriber's "individual-switch" is to disconnect the bridge normally formed across the talking circuit by the coils 82 and 83, and to thereby leave the circuit at this point free of inductive resistance, either in series or in bridge, with the exception, however, of the series coils 80 and 81, but which latter are, of course, of very low resistance and consequently of low self-inductance.

When conversation has been completed, all switches used by the calling subscriber, and the "individual-switch" of the called subscriber, will be restored to their normal positions by the restoration of the receiver on the switch-hook at the calling subscriber's station. This is due to the fact that the said switch-hook, in returning to its normal position, momentarily closes connection between ground and both sides of the line, in the well-known manner, thus energizing both the "line-relay-coils" Z and $Z^1$, and causing them to simultaneously attract their armatures, and to thus make contact between springs 92 and 93. This, of course, momentarily completes the circuit through the "release-magnet" V from ground through contact-springs 92 and 93, conductor 17, conductor 18 to battery and thence to ground. When thus energized and de-energized, the "release-magnet" V (Fig. 2), by disconnecting the locking-dog S from the ratchet-wheel R, in the manner previously described, effects the restoration of all parts of the "individual-switch" to their normal positions. It is also true, of course, that the parts of the "connector-switch" may be released in the well-known manner, and by the simultaneous action of the "line-relays" 43 and 45, which latter remain bridged across the talking circuit; but in addition to their regular function of closing the circuit through the "release-magnet" 108 of the "connector-switch", these relays may have a new function in this one respect,—to wit, that they complete the circuit through the "release-magnet" 75 of the called "individual-switch". This may occur as follows: When the "rotary line-relay" 45 attracts its armature, the contact-point 50 necessarily closes contact with contact-point 51; and this, in turn, serves to complete a circuit from ground through the battery, through contact-point 51, contact-arm 50, "private-wiper" 56, bank-contact 59, "private-normal" 61, contact-arms 63 and 62, conductors 84 and 85, contact-arms 86 and 94, and through "release-magnet" 75 to ground. It will be understood that the action of the "release-magnet" 75 restores the parts of the called subscriber's "individual-switch" to normal positions in the same manner that the calling subscriber's "individual-switch" is restored. As the wipers of the "individual-switch" return to normal position, the insulating-pin 91 again breaks contact between contact-springs 29 and 30, thus removing the guarding potential from the "private-normal" 33, and leaving the line of this subscriber open for use by other subscribers.

It will be readily understood that any suitable, known or approved arrangement can be employed for giving the calling subscriber a "busy" signal should the line of the called subscriber be already in use.

It will also be understood that the framework of my improved "individual-switch", and of the step-by-step mechanism or switch-operating machine, may be of any suitable or desired character consistent with the desired arrangement and disposition of the different magnets, armatures, banks and other parts.

It will be understood that the contacts of the bank Q (Fig. 2) are provided with outwardly and radially projecting terminals $q$, whereby the different contacts may be connected with their respective trunk-lines or other connections. As illustrated, the armature T is provided with an arm $t$ for disengaging the spring $V^4$ from the arm $S^1$. The said armature is also provided with an arm $t^1$ adapted for operating the switch-springs 9 to 12, inclusive, and 24 to 28, inclusive, as previously described. A spring $s$ is applied to the arm $S^1$, and employed as a means for keeping the dog S in engagement with the ratchet-wheel R—that is to say, when the arm $S^1$ is disengaged from the opening in the spring or arm $V^4$.

With further respect to the electro-magnetically-actuated step-by-step mechanism for operating the switch-operating shaft A, which latter is common to all of the "individual-switches" distributed along its length, it will be seen by referring to Fig. 8 that a spring $f$ causes the pawl F to engage the ratchet-wheel D. The locking-dog $f^1$, also adapted to engage said ratchet-wheel, prevents back rotation of the shaft A. The springs 1 and 3 normally engage each other, but are pushed apart by the lateral projection $h$ on the end of the arm H when the magnet G energizes and attracts its armature E. The end of the arm H then slips off from the spring 3 and onto the intermediate spring 2, as shown in Fig. 12; and, as illustrated, the springs 1 and 3 are separated when the springs and interrupter-arm assume the positions shown in Fig. 12. On its way back to normal position, the portion h of the interrupter-arm passes between the end portions of the springs 2 and 3, thereby keeping the springs 1 and 3 out of contact with each other until the interrupter-arm has entirely regained its normal position. When the interrupter-arm again resumes its normal position, it will then be immediately attracted, provided the normally-open switch-point in the circuit of the magnet G remains closed, by reason of the "private-switch-wiper" encountering a "busy" bank-contact. In this way, the magnet G is provided with circuit-breaking means for alternately opening and closing its own circuit, and for thus keeping the step-by-step mechanism in operation as long as the continuity of the magnet-circuit is maintained at all other points.

In Figs. 16 and 17 the construction shown is as follows: Fig. 16 represents the apparatus of the calling subscriber, while Fig. 17 shows the telephone and switching apparatus at the called subscriber's station. As the switch-hook J rises, when relieved of the weight of the receiver, the projection J² of the switch-hook momentarily contacts with the switch-point 112. This momentarily connects the "vertical" line-conductor, through the switch-hook, to ground at 101, thus sending the previously described preliminary impulse. The desired number may be called in any suitable way, as, for example, by manipulating the keys 113 and 114, so as to ground first one side of the line and then the other, and in accordance with the character and number of digits in the number. After the number is called, the key or button 115 can be pressed, so as to throw the ringing current onto the "line-circuit" extending between the two subscribers' stations. Normally, the bell 116 is bridged across the line through the medium of the switch-hook, as shown in Fig. 17. Also, the ground 101 is normally disconnected from the line. When the receiver J¹ is removed, the switch-hook rises, thereby opening the circuit of the bell, closing the contacts 118 and the contacts 119. The contacts 118 put the ground on the line, and the contacts 119 close the local circuit through the transmitter 120 and the local battery 121. When the receiver is placed upon the hook, the projection 111 passes at the outside of the contact 112 and is prevented from making contact by insulation 112ª, but the projection 122 passes downward outside of contact 99, thereby bringing the contacts 99, 100 and 123 together. This, as stated (it being observed that the projection 122 is insulated from the switch-hook), connects the two sides of the line together, and at the same time grounds the line at 101. Thus, the replacing of the receiver on the switch-hook accomplishes the previously described closing of circuits, resulting in the energizing of the "release-magnets" at the different switches.

In Fig. 18 the mechanical connections, and other parts, are as follows: This figure shows the "connector-circuits" and mechanism complete. As is usual in switches of this character, the switching mechanism includes a rotatable and vertically-movable switch-shaft 124 provided at its lower portion with the "private-wiper" 56, and with the "rotary-wiper" 57 and "vertical-wiper" 55. The wiper 56 is adapted to engage any one of the, say, one hundred contacts 59 in the "private-bank." Similarly, the wipers 57 and 55 are adapted to engage any one of the, say, one hundred pairs of contacts 58 and 60 in the "rotary" and "vertical" bank, it being understood that each pair of contacts in this bank consist of one "rotary-contact" and one "vertical-contact", connected respectively with the "rotary" and "vertical" normals leading to another switch, and with all multiples of such contacts in other "connectors." At its upper portion the said shaft is provided with the "vertical" ratchet-teeth 125, and with the "rotary" ratchet-teeth 126. A locking arrangement, comprising two rigidly-connected dogs 127 and 128, is adapted to normally engage said series of teeth, respectively, and to lock the shaft against downward movement or against back rotation. The "vertical-magnet" 43ª is provided with an armature 129, the latter carrying the dog 130. This dog is adapted to engage the teeth 125, when the armature is vibrated, and thereby produce the vertical or endwise movement of the switch-shaft. In a similar way, the "rotary-magnet" 45ª is provided with an armature 131, which carries a spring-pressed pawl 132 adapted to engage the teeth 126 to produce the step-by-step rotation of the said shaft. At its upper end, said shaft is provided with a clock-spring 133, which tends normally to rotate the shaft into its normal position, and which thus serves as the means for restoring the switch-shaft to its normal position, in a rotary direction, as soon as the releasing devices are operated. The armature 129 can be pivotally mounted at 134, and its movement toward the "vertical-magnet" is opposed by spring means of any suitable character, as, for example, the spring 135. The armature 131 can be pivotally mounted at 136, and its movement toward the "rotary-magnet" can be yieldably opposed by a spring 137. The pawl 130 is pivoted to the arm of the armature 129, and held against the teeth 125 by a spring 138. A spring 139 keeps the pawl 132 in engagement with the teeth 126, this pawl being pivotally mounted on the arm of the armature 131; it being understood, of course, that these spring-pawls 130 and 132 are normally out of engagement with the ratchet-teeth, and are brought into and out of engagement therewith in the usual manner, or by any suitable or desired guiding arrangement. The shaft-rest 140 normally engages the longitudinal groove 141 extending vertically through the ratchet-teeth 125; but when the shaft rotates, this hook 140 then engages under one of the teeth 125, so that while the shaft is thus rotating it is properly supported against downward movement—that is to say, the rest 140 engages underneath the tooth at whatever level the shaft happens to be rotating. The "release-magnet" 108 is provided with an armature 142, which may be pivotally mounted at 143. This armature is retained in its normal position by a spring 144, and is provided with a horizontally-disposed arm 145. This arm is provided at its end with an opening 146 adapted, when in the right position, to engage a vertical projection 147 on the rigid structure constituting the locking-dogs 127 and 128; it being observed that this structure may be pivotally mounted at 148, and thereby provided with a vertical axis. As shown, the arm 145 is adapted to be raised by an L-shaped arm 149 depending from the horizontal arm of the armature 129. When the "release-magnet" 108 is energized, its armature causes the opening 146 to engage the projection 147, and the instant retraction of the armature by the spring 144 then causes the locking-dogs 127 and 128 to be pulled out of engagement with their respective ratchet-teeth. The so-called "private-magnet" 150 is provided with an armature 151 adapted to be pivotally mounted at 152, thus enabling said armature to swing about a horizontal axis. This armature 151 is provided with a horizontally-disposed arm 153, and with a spring 154 for keeping it in its normal position. It will be seen that the end of the arm 153 is provided with a lateral arm 155 carrying at its end a roller 156 of suitable material, such as hard rubber. The flat upper and lower springs 157 and 158 are secured to the top and bottom surfaces of the arm 153 by rivets 159, thus leaving these springs 157 and 158 free to flex or bend toward or away from each other. These springs 157 and 158 are, however, provided with oppositely arranged ratchet-teeth 160 and 161. The "side-switch-arm" 162 is provided with a vertical axis 163, and is subject to the tension of the spring 164. This "side-switch" is also provided with an arm 165 which projects, normally, between the inner flat portions of the springs 157 and 158, and is in engagement with the first tooth 161, as shown in Fig. 18. At its other end, the "side-switch" member is provided with four "switch-arms" or wipers 166, 167, 168 and 169, each arm or wiper being provided with three positions or "switch-points" as follows: For the arm or wiper 169 there are the three "switch-points" 170, 171 and 172; for the wiper 168 the three similar "switch-points" 173, 174 and 175; for the wiper 167 the three "switch-points" 176, 177 and 178; and for the wiper 166 the three "switch-points" 179, 180 and 181. It will be seen that these four "side-switch-wipers" are mounted to swing about simultaneously, so that all four wipers normally occupy the first position, will then simultaneously shift to second position, and finally to third position. The arrangement for operating the "side-switch" is as follows: When the armature 151 is attracted by the "private-magnet" 150, the arm 153 is depressed, thereby allowing the arm 165 to slip off from the tooth 161 and onto tooth 160, which latter, it will be seen, is somewhat farther toward the outer end of the spring 157. This, of course, permits the spring 164 to pull the "side-switch" member 162 forward one notch, so to speak, thereby shifting the "side-switch-wipers" to second position, it being observed that as soon as the spring 154 retracts the armature 151, the arm 165 then slips into engagement with the second tooth 161, so as to give the "side-switch" the desired movement to second position. When the "private-magnet" is again energized, the arm 165 slips off from the second tooth 161 and onto the second or last tooth 160, and when the spring 154 retracts the armature, the arm 165 slips entirely out of engagement with these ratchet-teeth carried by the arm 153. It will be seen that when the arm 165 escapes from the first tooth 160, the movement of the "side-switch" is limited by reason of the stop or projection 182 being brought into engagement with the cam 183; and when the arm 165 finally escapes from engagement with all of the teeth, the movement of the "side-switch" is then limited by a suitable stop device 183ª. In this way, successive impulses can be employed for alternately energizing and de-energizing the "private-magnet" 150, and for thereby stepping or moving the "side-switch" from first position to second position, and thence from second position to third position.

The dogs 127 and 128 are subject to the tension of a spring 184 which tends to keep the two dogs in engagement with their respective ratchet-teeth. An arm 185 is rigidly connected with said locking-dogs, and is provided at its lower end with means for suitably connecting it with a link 186 extending to and suitably engaging an arm 187, which latter is rigid with the "side-switch" member 162. It is by this arrangement that the "release-magnet" 108 is not only capable of holding both the dogs 127 and 128 out of engagement with the ratchet-teeth, so as to permit the shaft to be restored to its normal position, but is also capable, when energized, of restoring the "side-switch" to its normal position. In other words, the "release-magnet" 108, when energized, causes the opening 146 to engage the projection 147; and then when the magnet is de-energized, and the spring 144 allowed to retract the armature 142, the movement is communicated through the arm 185, the link 186, and the arm 187 to the said "side-switch" member 162, and in such manner as to restore all of the "side-switch-wipers" to their normal or first position. This is possible, it will be seen, for the reason that the "side-switch-arm" 165 can pass inwardly to its normal position, between the two springs 157 and 158, inasmuch as the said arm can slip readily over the beveled sides of the teeth, the two springs yielding or separating sufficiently to permit of this restoration of the arm 165 to its normal position. The shaft 124 is also provided at its upper end with the so-called normal post arm 188, said arm being normally held against the normal post 189, and in engagement with the "switch-spring" 190. This spring 190 is, it will be seen, normally out of engagement with the contact-point 191. The "vertical-relay" 43 of this "connector-switch" is provided with an armature 192, and the "rotary-relay" 45 is provided with a similar armature 193. The previously described contacts 49, 50 and 51 are operated by the armature 193. The normally-separated contacts 194, 195 and 196, the contact 194 being preferably grounded at 197, are of the ordinary and usual form. The "back-release-relays" 52 and 53 are provided, respectively, with armatures 198 and 199, and with normally-separated contacts 200 and 201. In Fig. 18, the relatively heavy lines indicate the conductors included in the talking circuit; and this talking circuit, when energized, includes the previously described condensers 47 and 48, together with the "side-switch-wipers" 166 and 167, the contact-points 178 and 181, the shaft-wipers 57 and 55, and the bank-contacts 60 and 58. The ringing-relay 202 is provided with an armature 203, and with the normally-closed contacts 204, 205, and 206, 207, which contacts, it will be seen, are also included in the said talking circuit. This ringing relay is also provided with the contacts 208 and 209, which are normally out of engagement with the contacts 205 and 207, but which engage said contacts as soon as the ringing-relay is energized, and the talking circuit thereby open for the purpose of bridging the ringing generator 210 across the metallic "line-circuit" extending to the station of the called subscriber. The previously described third trunk-line-circuit includes, as will be seen, the contacts 49 and 50, the contact 175 and the "side-switch-wiper" 168, the shaft-wiper 56 and the "private-bank-contact" 59—that is to say, when the switches are in use and connected, as shown in Fig. 15. This "connector-switch" may be operated by the keys or push-buttons 113 and 114 shown in Fig. 16. Suppose it is desired to call a subscriber whose number is 25, it being understood that with the arrangement shown in the drawings the "connector-switch" is capable of establishing connection with any one of the one hundred subscribers' lines connected with the contacts 58 and 60: In such case, the calling subscriber, after the previously described connection has been established with the "connector-switch", first presses the button or key 114 twice, so as to send two impulses over the "vertical-line-conductor", and so as to thereby cause the "vertical-relay" 43 to close circuit with the "vertical-magnet" 43$^a$ twice; and this, of course, causes the pawl 130 to lift the shaft 124 to the second level; the locking-dogs 127 and 128 being released as the "vertical-armature" rises the first time because the hook 149 lifts the arm 145 from the lug 147. Then the calling subscriber presses the key or button 113 once, so as to cause the "rotary-relay" 45 to close the circuit of the "private-magnet" 150 once, thus moving the "side-switch-wipers", in the previously described manner, to the second position. This operation of the "side-switch" causes the wiper 169 to switch off the "vertical-magnet" and switch the "rotary-magnet" 45$^a$ into connection with the "vertical" "line-relay" contact-arm 195. Then when the calling subscriber presses the key 114 five times, to correspond with the last digit of the called number, the five impulses then cause the "rotary-magnet" 45$^a$ to rotate the shaft five steps, and thereby bring the shaft-wipers 55, 56 and 57 into position to engage the fifth contact in each of the rows or levels opposite which these wipers have been brought by the vertical movement of the shaft. After this, another single push of the key or button 113 again energizes the "private-magnet" 150, causing the latter to bring the "side-switch" into third position. This, of course, closes the previously described talking circuit, and in addition closes connection between the ringing-relay 202 and the contact-arm 195 of the "vertical-relay" 43 of the calling subscriber's line, it being observed that this circuit includes the contact 172 and the "side-switch-wiper" 169. The circuit thus closed through the ringing-relay also includes the contacts 211 and 212 of the "private-magnet-switch", and the normally separated contacts 194 and 195. Consequently, when the calling subscriber presses the button 115, the line-conductor 4 is connected to ground at 101, and a "line-circuit" thus formed including the "vertical-relay" 43 and the battery 96. This relay 43, when energized, closes contact between the normally-separated contacts 194 and 195, and thereby brings about the energization of the relay 202. This ringing-relay, when energized, opens the talking circuit by means of its springs, and bridges the generator 210 across the circuit running to the called subscriber's station. The alternating current thus projected onto the called subscriber's line will ring the bell 213 shown in Fig. 17. Suppose, however, that the line of the called subscriber should be found busy: In such case, the "private-magnet" 150, the last time it is energized by the pressure of the button 113, will close contact between the springs 214 and 215, it being remembered that at this time the "side-switch" is in second position. When this is done, and before the "side-switch" can advance to third position, a local circuit is formed from the battery 96 through the "release-magnet" 108, thence through the springs 215 and 214, through the contact 174 and the "private-wiper" 168 of the "side-switch", through the "private-wiper" 56 of the shaft-switch, through the "private-bank-contact" 59, through the "private-normal" 61, and thence to ground through springs 62 and 63 of the called "individual-switch" (see Fig. 15), through the spring 86 and the contact 94, and thence through the "release-magnet" 75 to ground at 216, in the manner previously described. The "release-magnet" 108, being thus energized, immediately attracts its armature and thereby releases the step-by-step mechanism in the manner already explained; and then the "busy" signal will be given the calling subscriber as follows: The "connector" having been thus released, and the "side-switch" returned to normal position, the calling subscriber then presses the button 115 with the idea of grounding the line, and thereby accomplishing the ringing of the called subscriber's bell in the usual manner. At such time, however, the grounding of the line-conductor 5, instead of ringing the called subscriber's bell, simply sends one impulse through the "vertical-relay" 43, and thereby causes the "vertical-magnet" 43ª to lift the shaft upwardly one step, but sufficiently to bring the spring 190 into contact with the contact-point 191. No rotation of the shaft having occurred at this time, the "side-switch-wiper" 167 is still in engagement with the contact-point 176, which latter is connected with the contact-point 191. The conductor 217, which is connected with the spring 190, can be connected at its other end with any of the so-called "busy" signal machines—that is to say, machines for producing current suitable for the well-known "busy" signal. In this way, the pressure of the button 115, with the "connector" in its restored position, simply connects the said "busy" machine through to the "vertical" trunk-line conductor 40, and to the "vertical" line 4 of the calling subscriber's line, through the switch-hook-contacts 219 and 218, through the contacts 220 and 221 of the ringing-key, through the winding 222 of the induction-coil, and thence through the receiver $J^1$, in the usual manner, and producing the well-known buzzing sound. In this way, the "connector-switch" cannot be made to make connection with a busy subscriber's line, nor can a calling subscriber, under such conditions, do anything more than receive the "busy" signal transmitted from the central station through the "connector".

The initial circuit, of course, of the "vertical-magnet" 43ª includes the "side-switch-wiper" 169 and the contact-point 170, together with the contacts 211 and 212, which latter are separated each time the "private-magnet" 150 is energized. When the calling subscriber hangs up his telephone, and thereby releases the switches in the manner previously described, the "vertical" and "rotary" relays 43 and 45 are energized, thereby closing a circuit from battery 96, through "private-magnet" 150, to ground at 197, and back to battery. The "private-magnet" 150, in attracting its armature, separates the springs 211 and 212, and closes contact or electrical connection between springs 212 and 215; and this gives a circuit from battery through the "release-magnet" 108, through springs 215, 214 and 212, in the order mentioned, and then through contacts 195 and 194 to ground and back to battery. Thus, the "connector-switch" is released by the calling subscriber; but when the "connector" is released by the called subscriber, by energizing the "back-release-relays" 52 and 53 in the previously described manner, then the circuit of the "release-magnet" is from battery 96, through its coil to conductor 107, thence through springs 200 and 201, to ground 104 and back to battery. When the calling subscriber releases the "connector", it will be seen that an undesirable actuation of the "vertical-magnet" might result therefrom were it not for the "switch-arm" 155 and the contacts 211 and 212 which, at such time, are separated by the downward movement of the roller 156.

The selector represented at U in Fig. 19 is of the general type disclosed in United States Letters Patent No. 815,321, granted March 13, 1906, to Keith, Erickson & Erickson. Selectors of this kind were well known and used prior to my invention. Among other details the selector comprises the wipers 301, 302 and 303 carried upon a shaft (not shown) which has a vertical motion controlled by the vertical magnet 304, and a rotary motion controlled by the rotary magnet 305. The calling subscriber controls the operation of the selector through the medium of the vertical and rotary line relays 306 and 307. The side switch, which is composed of the wipers 308, 309, 310 and 311, is controlled by the private magnet 312 in the same manner that the private magnet of the connector controls its side switch. When a selector is included in the connection the operation of the system is as follows: Referring to Fig. 19, the operation of the individual switch by the preliminary impulse over the line conductor 4 is the same as in the previous case. In this case, however, the operation of the individual switch extends the connection from the subscriber's line to a selector U instead of to a connector. Now, when the calling device at the substation is operated for the first digit of the desired number the selector U will be affected to extend the connection to an idle connector which has access to the desired line. Each time the button 114 is pressed for the first digit a ground impulse is transmitted over the line 4 through the relay z, conductor 8, springs 9 and 10, conductor 13, wiper O, conductor 40 and vertical relay 306 to battery 314. The relay 306 responds to each of these impulses and operates to close an energizing circuit through the vertical magnet 304. This circuit extends from ground through the springs 315 and 316 of the relay 306, private magnet springs 317 and 318 and vertical magnet 304 to battery 314. Each time that the vertical magnet 304 is energized it raises the shaft and wipers 301, 302 and 303 one step. After the vertical impulses have been completed the rotary button 113 at the substation is pressed once, whereby a single ground impulse is transmitted over conductor 5, through relay z', springs 24 and 25, wiper O', conductor 39 and rotary relay 307 to battery 314. The rotary relay operates in response to this impulse to close an energizing circuit from ground through the springs 315 and 319 and private magnet 312 to battery. The consequent energization and de-energization of the private magnet 312 releases the side switch to second position. When the side switch wiper 311 engages its second-position contact point it closes an energizing circuit from ground through the rotary magnet 305 and its interrupter springs to battery. As soon as this circuit is closed the rotary magnet 305 attracts its armature, which rotates the switch shaft, presses down the armature of the private magnet 312 and opens the circuit of its own magnet at the interrupter springs 320. As soon as this energizing circuit is opened the rotary armature falls back, and if the first trunk is idle the private armature also returns to normal position and permits the side switch to pass to third position, thereby completing the connection to the connector switch. If the first trunk is busy, however, on account of having been seized by some other selector, the private wiper 303 finds a guarding ground potential upon the first private bank contact, and the selector wipers are caused to be automatically rotated to the next or an idle trunk in the following manner: When the private wiper 303 is rotated onto a guarded contact by the first step of the rotary magnet, an energizing circuit is completed from said guarded contact through the relay 321, side switch wiper 310 (in second position) and private magnet 312 to battery. The relay 321 does not receive sufficient current to be energized over this circuit, but the private magnet 312 does energize and hold back. The private magnet being thus energized the side switch is locked in second position and the rotary magnet will continue to be intermittently energized through its interrupter springs until the shaft wipers reach an idle trunk. When the wipers pass onto the contacts of an idle trunk the energizing circuit of the private magnet is no longer maintained, and the side switch is permitted to pass to third position, permanently opening the circuit of the rotary magnet and extending the line connection to the connector switch. When the side switch wiper 310 engages its third-position contact a guarding potential is established at the private bank contacts of the seized trunk. This potential extends from ground at the individual switch, through the release magnet V, springs 28 and 27, wiper P, conductor 41, side switch wiper 310, relay 321 and wiper 303 to the private bank contacts of the seized trunk. Although the magnet V and relay 321 are included in the path of the guarding potential, they do not have sufficient resistance to destroy the effectiveness of this potential, but are so adjusted that they are not energized in series with the private magnet of any selector which rotates over the contact of this trunk. The connector and the individual switch of the called line are operated in the same manner as in the previous case.

After the conversation is completed the individual switches and connector are released in the same manner as previously explained. If the calling subscriber is first to hang up his receiver the line relays 306 and 307 energize in multiple with the relays 43 and 45 of the connector, and close the energizing circuit of the release magnet 313. This circuit extends from ground through the springs 315 and 316 of the relay 306, private magnet springs 317 and 322, the private magnet 312 being now energized by the energization of the relay 307, and release magnet 313 to battery.

The "connector" shown in Fig. 18 is of the type shown and described in Patent No. 815,176 granted March 13, 1906, to Keith, Erickson & Erickson. The subscriber's calling device or switching apparatus shown in Figs. 16 and 17 may be of any suitable or well-known type.

From the foregoing it will be seen that an automatic telephone system can be constructed without a single step-by-step mechanism which is individual to one subscriber—that is to say, without using any step-by-step mechanisms or devices, each of which is allotted to and employed by a single subscriber, and by that subscriber only. On the contrary, my invention contemplates a less number of step-by-step mechanisms than the total number of subscribers, each step-by-step mechanism being common to all of the members of a group of subscribers, and each step-by-step mechanism being available by any subscriber in the group for use in operating one of a number of switches allotted to such group of subscribers, and for thereby establishing connection between the calling subscriber's line and the first trunk-line or other connection necessary in securing the desired connection with the called subscriber's line. Again, it will be seen that the apparatus includes a number of step-by-step mechanisms, each of which is common to all other subscribers in a certain group, and each of which is subject to the controlling influence of any one of a number of relays, each of which is individual to one of the subscribers in such group. As illustrated, the step-by-step mechanism which is allotted to the group of subscribers, and which constitutes the first step-by-step mechanism to be operated by any one of said subscribers in securing the connection with the line of some other subscriber, is associated with and allotted to a number of switches, each of which is individual to one of such subscribers; but it will be readily understood that this step-by-step mechanism may be allotted to any suitable or desired number of switches of any suitable character, but preferably each adapted to serve as the means for connecting the calling subscriber's line directly with a trunk-line, or other connection, and each, when used, constituting the first of the series of switches which remain in their operative positions during conversation between two subscribers. Whatever the arrangement, however, it will be seen that my invention results in a substantial reduction in the total number of first "selectors," second "selectors," "connectors," or other like switches, as well as in the total number of step-by-step mechanisms. The only switches which are individual to the different subscribers are those which are distributed along the length of the shaft of the switch-operating machine, and even these are all under the control or influence of a single step-by-step mechanism—that is to say, there are no step-by-step mechanisms which are individual to the different subscribers. As shown, and as previously stated, the means of communication between the step-by-step mechanism, and the different switches to which it is allotted, is a purely mechanical one, inasmuch as the step-by-step action of the electro-magnetically-actuated ratchet device is communicated mechanically to any one of the different switches to which the ratchet device is allotted. It is obvious, however, that a suitable number of step-by-step switches, of any suitable character, can be allotted to a group of subscribers, and that the means of communication between these switches and the step-by-step mechanism which is common thereto can be either mechanical, electrical, or of other known equivalent character; the essential requirement or characteristic being that when a calling subscriber actuates the relay which is individual to his line, and thereby sets in motion the step-by-step mechanism which is common to all the subscribers in this group, the operation of the said step-by-step mechanism shall then effect, through the medium of any suitable means, the operation of one of a number of suitable switches allotted to such group of subscribers, and which switch remains in its operated position during conversation between the two subscribers. Furthermore, and with the particular arrangement shown, the operation of the step-by-step mechanism, which is common to the members of a group of subscribers, and the consequent operation of the switch, all take place preliminary to calling the number. In other words, a switch-operating machine is employed and made common to the members of a group of subscribers, and a number of suitable switches are also employed and made common to the same group of subscribers; and it is through the medium of this switch-operating machine that the calling subscriber effects the operation of one of said switches, and whereby the selected switch is operated to establish connection between the subscriber's line and the trunk-line before the calling subscriber is ready to begin calling the desired number, for the operation is quickly accomplished, and the connection between the subscriber's line and the trunk-line will have been accomplished by the time the calling subscriber is ready to begin sending the impulses representing the different digits of the called number.

It will be readily understood that the batteries 95, 96, 97 and 314 can be employed separately, as shown, or may be employed simply as one battery, so that all of the current for signaling and switching purposes will be derived from a single battery or source of supply. The windings Y and Y¹, together with the core, constitute an electromagnet having two functions,—to-wit, the closing of the circuit through the "rotary-magnet" G, and the opening and closing of the mechanical power-transmitting connection between the switch and the shaft. For this reason, the said electro-magnet may be termed a "rotary-magnet," or may be referred to as a "switch-connecting-magnet." The operation of the called "individual-switch," shown at the left in Fig. 15, is useful in two respects, that it breaks connection between the wipers 67 and 71, and the contacts 73 and 72 upon which the said wipers normally rest. This, as previously stated, disconnects or cuts off the bridge normally existing across the called subscriber's line, and including the coils 82 and 83 of the magnet which controls the "rotary-magnet" 76, and which closes the mechanical connection between the switch and the shaft. Furthermore, the said called "individual-switch," when operated to the full extent of its range of adjustment or swing, separates the contacts 64 and 65, in the manner explained, and thereby opens the circuit of the "rotary-magnet" 76, and consequently discontinues the vibratory action of this magnet and the resulting step-by-step rotation of the switch-operating shaft. The third trunk-line conductor 41, running between the calling "individual-switch" and the said "connector-switch," has a plurality of functions, for example, it not only serves as the means for grounding the contact 59, and all the multiples thereof, through the "release-magnet" V, so as to maintain a guarding potential at these contacts, but it also enables the called subscriber, in case the calling subscriber fails to hang up his receiver, to effect a release of all the switches. For example, if the called subscriber is first to hang up his telephone, this causes the switch-hook J to engage the contacts 99 and 100. These contacts, when brought together, connect the two sides of the line, and at the same time connect the line to ground at 101. This, it will be seen, closes a circuit through the "line-relays" 81 and 80, and also through the "back-release-relays" 53 and 52, in parallel, and in circuit with the battery 96. The relays 81 and 80, when energized, close a local circuit from battery 95 through the contacts 102 and 103, through the "release-magnet" 75, and thence to ground and back to battery. This, of course, releases the mechanism of the called "individual-switch." The energizing of the "back-release-relays" 52 and 53 closes a circuit from ground 104 (see Fig. 18) through the contacts 106 and 105, through the conductor 107, through the "release-magnet" 108 of the "connector," thence through conductors 109 and 110 to battery 96, and to ground. This, of course, serves to release the mechanism of the "connector;" but with the arrangement shown, and before the said "back-release-relays" can attract their armatures, a circuit is formed from battery 95, through the contacts 102 and 103, through the spring 86, through conductor 84, and contacts 62 and 63, conductor 61, through the "private-wiper-switch-contacts" 59 and 56, through switch-contacts 49 and 50, through the third trunk-line 41, through contacts 36 and P, through the conductor 23, through contact-spring 27, thence through the "release-magnet" V to battery and to ground; and this circuit, it will be understood, is formed before the insulation 91 opens contact between springs 62 and 63. In this way, the "release-magnet" V can be energized by the called subscriber in hanging up his telephone, and the mechanism of the calling "individual-switch" thereby released. By referring to Fig. 19 it will be seen that the relay 321 of the selector U is included in the conductor 41, over which the release magnet V of the individual switch is energized. This relay is energized in series with the magnet V and operates to close an energizing circuit through the release magnet 313 of the selector. This circuit extends from ground through the springs of the relay 321 and through the magnet 313 to battery. By this means the selector is also released by the called subscriber in hanging up his telephone.

Although the "release-magnet" V of the "individual-switch" is included in the connection between the grounded pole of the battery and the "private-bank-contacts" of the "connector", so that the coil, corresponding to coil 83, of any other "individual-switch", in attempting to make connection with any of the multiples 59, 60 and 58, will be energized, and the "rotary-magnet" of the said "individual-switch" thereby kept in operation, it is evident that the resistance of each "release-magnet" of the different "individual-switches" can be so low, for example, that a momentary closing of circuit through any one of them in this manner will not result in a sufficient energization thereof to release the mechanism of the "individual-switch" to which such "release-magnet" is allotted. In other words, when a third "individual-switch" is set in motion, and when one of the coils of its "rotary-magnet" is brought into circuit with the "release-magnet" of the calling "individual-switch", the result is a continuance of the operation of the said third "individual-switch", but without any danger of the restoration or release of the said calling "individual-switch"; and this, it will be seen, may be accomplished by relatively adjusting or regulating the resistances of the said "release-magnets" and the said coil or coils of the "rotary-relay" with which each "individual switch" is provided. Thus, as stated, the third trunk-line conductor 41 serves both as a means of establishing a guarding potential at the multiples of any particular contacts in use at the "connector", and also as a means of enabling the called subscriber to release all of the switches in case the calling subscriber should fail to hang up his receiver.

In any event, however, the construction of the apparatus, and of the circuits, is such that a preliminary impulse transmitted over the calling subscriber's line—that is, preliminary to calling the number—is sufficient to start the operation of a switch-operating machine which is common to a plurality of switches, such, for example, as a number of switches, each of which is individual to a subscriber's line, and to thereby effect the operation of one of said switches, but without interfering with the subsequent use of the said switch-operating machine for operating other switches while the said operated switch remains in use for either talking or signaling purposes. It is not only true that the switch-operating machine is available for use by other subscribers after one subscriber has finished using it; but it is also true that the said switch-operating machine may be used by several subscribers at the same time, so that the shaft will be rotated practically continuously; for it will be seen that the arrival of a certain subscriber's switch-wipers at a point where they engage non-busy contacts brings about the instant disconnection of such subscriber's switch from the shaft. In other words, the shaft may be rotated continuously, and in such case each subscriber, in making a call, will connect his switch with the shaft, the switch only remaining in connection with the motive power long enough to bring the switch-wipers into engagement with idle bank-contacts; and the rotation of the shaft may then continue for the purpose of picking up and dropping other switch-wipers at the proper point or points, it being in this way unnecessary for one subscriber to wait until another subscriber has finished using the switch-operating machine. Of course, should two subscribers remove their receivers from their respective switch-hooks at identically the same moment, so as to transmit preliminary impulses at identically the same time, it is evident that the two subscribers might possibly get the same connection; but this obviously is unlikely, and practically impossible.

With respect to the subscribers' apparatus, it will be seen that $J^2$ must engage 112, when the hook moves upward, before 219 engages 218, and after $J^3$ breaks contact with $219^a$; as with this arrangement the desired operations will take place when the receiver is removed from the switch-hook, although it is evident that various other arrangements and constructions can be employed in place of the one herein shown and described.

As has been previously made to appear, the locking-dogs 127 and 128 are, of course, normally out of engagement with their respective ratchet-teeth, and are not brought into engagement therewith until the "vertical-magnet" $43^a$ is energized, and the apertured end of the arm 145 thereby disengaged from the projection 147, thus permitting the spring to pull the locking-dogs into engagement with the ratchet-teeth. In other words, the aperture 146 normally engages the projection 147, so as to keep the locking-dogs out of engagement with the ratchet-teeth, and the first impulse transmitted through the "vertical-magnet" $43^a$ serves to release the dogs. At this juncture, it will also be observed, as previously explained, that it is the spring 144 which really does the releasing, inasmuch as the release cannot take place until the "release-magnet" 108 is energized. In a "connector" for this particular purpose, and in connection with the "individual-switch" arrangement herein shown and described, it is better to have the "release-magnet" effect the release of the "connector" when such magnet is de-energized, rather than when the magnet is energized. This is for the reason that if the release is effected when the magnet is de-energized, the calling "individual-switch" can be released first, when the releasing is done by the called subscriber, and the release of the "connector" will then follow. In other words, it is desirable, in the present case, to employ a slow release, so to speak, for the "connector" in order to give the calling "individual-switch" time to release when the restoration or release of the different switches is brought about by the called subscriber.

It will be seen that the teeth of the gear-wheels L are preferably beveled, and so formed that the natural tendency, when the connection is closed, is for the gear-wheels to separate, thus making it practically impossible for the connection, in each case, to remain closed longer than is necessary or desirable—that is to say, the switch will be disconnected from the shaft the instant the wipers are brought into engagement with idle bank-contacts.

With further respect to the subscribers' apparatus, it will be seen that, for the broader purposes of my invention, any impulse is a preliminary impulse, so to speak, which traverses the "line-circuit" and operates the "individual-switch" before or just ahead of the impulse or impulses which then quickly follow for the purpose of operating a first "selector," a "connector," or other switch adapted to receive only number impulses. In this connection it will also be seen that when the subscriber's switch-hook rises, the projection 122 passes between the contacts 99 and 100, thus preventing closure of these contacts together; but when the switch-hook is depressed by the replacement of the receiver, then the projection 122 passes outside of the contact 99, and in so doing brings the three contacts 99, 100 and 123 together, in the manner previously described. It will also be seen that the switch-hook-projection J⁴ keeps the contacts 118 normally separated, while the projection J⁵ only closes the contacts 218 and 219 when the receiver is removed from the hook. In addition, it will be understood that the subscriber's bell 116 is normally bridged across the "line-circuit" through the medium of the contacts 219ᵃ, J³, the body of the switch-hook, and the conductors 116ᵃ and 116ᵇ. Only when the receiver is removed are the switch-points 113ᵃ and 114ᵃ of the calling switch devices grounded at 101. In this way, the subscriber's apparatus is normally bridged across the line through the medium of the keys 113 and 114 and their normal or resting contacts 113ᵇ and 114ᵇ.

It will be understood, of course, that for some of the broader purposes of my invention the motive power or propelling means for the switch-operating machine may be of any suitable, known or approved character, and is not necessarily under the control of subscribers, inasmuch as the arrangement shown involves means, under the control of the subscribers, for connecting the switches with the machine at will, and for automatically disconnecting the same as each switch arrives at an idle or non-busy position—that is, in position to give the calling subscriber a non-busy trunk-line or other line connection.

I claim as my invention:

1. A switching apparatus comprising a rotatable shaft, a plurality of trunk-selecting switches distributed along said shaft and normally disconnected therefrom, means allotted to each switch for connecting it thereto and disconnecting it therefrom, together with a single step-by-step mechanism for rotating said shaft to cause any connected switch to automatically select an idle trunk, said step-by-step mechanism being common to all of the switches distributed along the said shaft.

2. A switching apparatus comprising a plurality of trunk-selecting switches, a switch-operating machine common to all of said switches, adapted to cause any switch to automatically select an idle trunk together with means allotted to each switch for mechanically connecting it therewith and disconnecting it therefrom.

3. A switching apparatus comprising a plurality of trunk-selecting switches, a single step-by-step mechanism normally disconnected from all of said switches, together with means allotted to each switch for mechanically connecting it with said step-by-step mechanism and disconnecting it therefrom, each switch having individual disconnecting or restoring means, whereby said step-by-step mechanism may be used for operating any one of said switches.

4. A telephone system comprising a plurality of first-selectors, a plurality of switches, a switch-operating machine common to all of said switches, a group of subscribers' stations to which the said switches and switch-operating machine are allotted, said machine and one of said switches constituting the necessary but sufficient preliminary switching means for automatically connecting a calling subscriber's line with an idle one of said selectors, and means at the subscribers' stations whereby each subscriber may cause said machine to operate one of said switches preliminary to calling the number of the desired subscriber, each first-selector adapted to perform a trunking operation corresponding to the first digit of any called number.

5. A telephone system comprising a group of subscribers' stations, a normally at rest switch-operating machine allotted to said group and common to all of the stations included therein, subject to the control of any subscriber thereof, a suitable number of switching devices also allotted to said group, each provided with a bank of line terminals, suitable means whereby the said switch-operating machine may be set in operation by any subscriber in the said group, a number of trunks, and means whereby the said machine when set in operation causes one of said switches to establish connection between the line of the calling subscriber and one of said trunks.

6. An automatic telephone system comprising a plurality of step-by-step switches, a step-by-step ratchet mechanism, means through the medium of which the said mechanism is adapted to be employed for effecting the connecting operation of any one of said switches, each switch provided with a bank of line terminals, and means for automatically selecting idle line terminals.

7. An automatic telephone system comprising a plurality of step-by-step switching devices, a normally at rest switch-operating machine, means through the medium of which said machine may be employed for effecting the connecting operation of any one of said switching devices independently of the others, each switching device having a bank of line terminals and means for automatically selecting idle line terminals.

8. An automatic telephone system comprising a plurality of subscribers' lines, a relay for each line, a plurality of switches of any suitable number, and a normally at rest switch-operating machine provided with suitable means of communication for operating any one of said switches, said machine including an operating magnet controlled by and common to all of said relays, whereby the said machine may be used by any one of said lines for effecting the operation of one of said switches.

9. An automatic telephone system comprising lines, a plurality of switches, a rotatable shaft along which the said switches are located at suitable points or intervals, a normally-open mechanical connection between each switch and the shaft, electro-magnetic means for opening and closing said mechanical connections, and thereby permitting said shaft to be used for operating any one of said switches independently of the others, to close connection with an automatically selected line, a ratchet device for giving said shaft a step-by-step rotary motion, and electro-magnetic means for operating said ratchet device.

10. An automatic telephone system comprising a plurality of switches, a subscriber's line connected with each switch, a rotary shaft along which said switches are distributed, adapted for rotation only in one direction, a normally-open mechanical connection between each switch and the shaft, electro-magnetic means for opening and closing said connections, thereby permitting said shaft to be used for operating any one of said switches independently of the others, to close a connection, a ratchet device for giving said shaft a step-by-step rotation, electro-magnetic means for operating said ratchet device, and subscribers' switching devices for controlling all of said electro-magnetic means, whereby any subscriber whose line terminates at one of said switches may employ said shaft and ratchet device for operating his "individual-switch", to close a connection without interfering with the subsequent use of said shaft and ratchet device while his switch is in use for talking or signaling purposes.

11. An automatic telephone system comprising a plurality of switches, a normally at rest switch-operating machine common to all of said switches, means through the medium of which said machine can operate any one of said switches independently of the others, without interfering with the subsequent use of said machine by other subscribers while one or more of said switches is or are in use for either talking or signaling purposes, each switch provided with a plurality of line terminals.

12. An automatic telephone system comprising a plurality of switches, a switch-operating machine, normally-open means of communication between the said machine and the said switches, electro-magnetic means for opening and closing said means of communication, thereby permitting said machine to be employed for causing the desired operation of any one of said switches independently of the others, for closing a connection, and automatic means whereby said machine, after causing the operation of one of said switches, is instantly disconnected therefrom and put in condition for use in operating other switches while the said operated switch remains in use for either talking or signaling purposes, each switch provided with a plurality of line terminals.

13. A step-by-step selective switching apparatus comprising a plurality of switches, a switch-operating machine common to all of said switches, means for employing the said machine to effect the operation of any one of said switches independently of the others, for closing a connection, and automatic means whereby said machine, after operating a switch in the desired manner, is then available for use in operating other switches while the said operated switch remains in use for the desired purpose, each switch provided with a plurality of line terminals.

14. A switching apparatus comprising a plurality of switches, an operating shaft common to all of said switches, and means whereby said shaft may be employed for operating any one of said switches independently of the others, for closing connection with an automatically selected line, without interfering with its use in operating other switches while the said operated switch remains in use for the desired purpose, each switch provided with a plurality of line terminals.

15. An automatic telephone system comprising a plurality of "individual-switches," an operating member common to all of said switches, and means whereby said member may be employed for operating any one of said switches independently of the others, and without interfering with its use in operating other switches while the said operated switch remains in use for either talking or signaling purposes.

16. An automatic telephone system comprising a plurality of "individual-switches," an operating member common to all of said switches, and mechanical power-transmitting connections whereby said member may be used for operating any one of said switches independently of the others, and without interfering with its use in operating other switches while the said operated switch remains in use for either talking or signaling purposes.

17. An automatic telephone system comprising a plurality of subscribers' lines, a pair of "line-relays" connected in series in opposite sides of each line, a relay normally in bridge of each line, a plurality of switches, and switch-operating means common to all of said switches and controlled by said bridged relays.

18. An automatic telephone system comprising a plurality of switches, a shaft common to all of said switches, electro-magnetically-actuated means for giving said shaft a step-by-step rotation, normally-open mechanical connections between said shaft and the different switches, and a relay allotted to each switch, said relays being adapted to both control the said electro-magnetically-actuated means and open and close the said mechanical connections.

19. An automatic telephone system comprising a switch, a step-by-step ratchet device for operating said switch, but normally disconnected therefrom, and a relay adapted to both control the operation of said step-by-step device and open and close mechanical power-transmitting connection between the same and the said switch.

20. An automatic telephone system comprising a plurality of switches, means for operating said switches, and a relay allotted to each switch, each relay being adapted to both control the operation of said means and open and close communication between the same and one of said switches.

21. A switching apparatus comprising a switch, means for operating the switch, and a relay adapted to both control said means and open and close mechanical power-transmitting connection between the same and said switch.

22. An automatic telephone system comprising subscribers' lines, a switch for each line, a shaft common to all of said switches, each switch being provided with a gear-wheel, a corresponding number of gear-wheels slidingly mounted upon said shaft but adapted to rotate therewith, a step-by-step ratchet device for rotating said shaft, and electro-magnetic means for shifting the gear-wheels of the shaft into and out of engagement with the gear-wheels of the switches, whereby said shaft and ratchet device may be employed for operating any one of said switches independently of the others, and without interfering with the subsequent use of the said shaft and ratchet device for operating other switches while the said operated switch remains in use for either talking or signaling purposes.

23. An automatic telephone system comprising subscribers' lines, switches connected with said lines, each switch having a plurality of bank-contacts, trunk-lines less in number than the subscribers' lines and connected with said bank-contacts, a shaft common to all of said switches, a ratchet device for operating said shaft, subscribers' switching devices, and means controlled thereby for opening and closing connection between the shaft and the different switches, and for thereby permitting the shaft to be employed for operating any particular switch independently of the others, and an electro-magnet for operating said ratchet device, together with a local energizing circuit for said magnet.

24. An automatic telephone system comprising subscribers' lines, an "individual-switch" for each line, each switch having a normally bridged magnet, trunks for talking leading from said switches, means controlled by each of said magnets for seizing said trunks, means for seizing said lines to extend connection thereto, and means for furnishing all necessary current, each switch, whether of the calling or the called line, being adapted to open up or cut off its bridged magnet while the line is in use.

25. An automatic telephone system comprising a calling subscriber's line, a called subscriber's line, a couple of switches individual respectively to the calling and called lines, trunks for talking leading from said switches, means included in each of said switches for seizing said trunks, means for seizing said lines to extend connection thereto, the switch of the calling line occupying the operated position necessary for making connection between the two lines, each switch having a normally bridged resistance, and the switch of the called line occupying a position in its range of switching adjustment sufficient to open or cut off its said normally bridged resistance.

26. An automatic telephone system comprising a plurality of switches, a shaft common to all of said switches, means under the control of the subscribers for connecting and disconnecting said switches with the shaft, each independently of the other, a ratchet mechanism for rotating said shaft in a step-by-step manner, a "rotary-magnet" for actuating said ratchet mechanism, said magnet also being under the control of the subscribers, a circuit-breaking device operated by said magnet, an energizing circuit for said magnet including said circuit-breaking device, and means whereby the said circuit is maintained until any switch being operated thereby selects and occupies a non-busy connective position.

27. An automatic telephone system comprising a plurality of subscribers' lines, a plurality of switches, and means for operating said switches, said means including an electro-magnet common to all of said switches, and common to all of said subscribers' lines, a circuit-breaking device, an energizing circuit for said magnet including said circuit-breaking device, whereby said magnet alternately opens and closes its own circuit, and means by which said circuit prevents connecton between a calling subscriber's line and a busy subscriber's line.

28. An automatic telephone system comprising a calling subscriber's line, a called subscriber's line, a pair of trunk-line-conductors, an "individual-switch" connecting the calling subscriber's line with the said trunk-line-conductors, "line-normals" connected with the called subscriber's line at the central station, an "individual-switch" connected with the called subscriber's line at the central station, a "connector-switch" constituting a medium of connection between the said trunk-line-conductors and the said "line-normals", said "connector-switch" having a relay, and having bank-contacts connected with said "line-normals", and a third trunk-line-conductor connected at ground at the calling "individual-switch", said "connector" being also provided with a plurality of "private-bank-contacts" connected in multiple, together with means including said third trunk-line-conductor and a grounded battery for establishing a guarding potential at said multiple contacts, whereby the called subscriber's line cannot be seized by any other subscriber while this line and the calling subscriber's line remain connected for conversation or other purposes, the continuity of the connection between said contacts and the grounded pole of said battery being controlled at a plurality of points, and at one point by said relay.

29. An automatic telephone system comprising a calling "individual-switch", a called "individual-switch", a "connector-switch" provided with a plurality of bank-contacts, and a plurality of wipers cooperating therewith, one of said wipers being a "private-wiper", means for connecting the two "individual-switches" including said wipers and bank-contacts, and including a third or additional conducting path grounded at opposite ends at the two "individual-switches", together with a battery having one pole grounded, said third or additional conducting path including said "private-wiper".

30. An automatic telephone system comprising a calling "individual-switch", a called "individual-switch", each switch being provided with a "release-magnet", parallel conducting paths extending between said switches, a third conducting path extending between said switches and including said "release-magnets", said third conducting path being grounded at each switch, a battery having one pole grounded, together with means for closing connection between a non-grounded pole of said battery and a point in said third conducting path intermediate of said magnets.

31. An automatic telephone system comprising a plurality of switching devices, a normally at rest switch-operating machine, said machine adapted to operate one or more of said switches at a time, means under the control of subscribers for setting said machine in operation, and means controlled by the subscribers and through the medium of which said machine, when set in operation, will cause the operation of one or more of said switching devices, each switching device having a bank of trunk-line terminals.

32. An automatic telephone system comprising a plurality of subscribers' individual switching devices, a switch-operating machine common to all of said switching devices, means under the control of subscribers for setting said machine in operation, and means also under the control of subscribers for connecting said switching devices with said machine, said machine adapted to operate one or more of said switches at a time, whereby one subscriber may employ said machine for operating one of said switching devices while the said machine is still in use for other purposes.

33. An automatic telephone system comprising a plurality of trunk-selecting switches, a switch-operating machine common to all of said switches, normally open power transmitting means under the control of subscribers for connecting the switches with the said machine, automatically-actuated devices for opening said means and mechanically disconnecting each switch from the machine as soon as the desired position of the switch is reached, said machine adapted to operate one or more of said switches at a time, whereby said machine, although already in use for operating one or more switches, may be connected for operating any particular switch.

34. An automatic telephone system comprising a plurality of trunk-selecting switches, a switch-operating machine common to all of said switches, means controlled by subscribers for connecting the switches with the said machine, together with means for automatically disconnecting the switches from the machine, said machine adapted to operate one or more of said switches at a time, whereby any switch may be thrown into connection with the said machine while the latter is still connected with and operating other switches.

35. An automatic telephone system comprising a plurality of switches, a subscriber's line connected with each switch, a shaft along which said switches are distributed, a normally-open mechanical connection between each switch and the shaft, electromagnetic means for opening and closing said connections, and thereby permitting said shaft to be used for operating any one of said switches independently of the others, a ratchet device for giving said shaft a step-by-step rotation, electro-magnetic means for operating said ratchet device, and subscribers' switching devices for controlling all of said electro-magnetic means, whereby any subscriber whose line terminates at one of said switches may employ said shaft and ratchet device for operating his "individual-switch", and without interfering with the subsequent use of said shaft and ratchet device while his switch is in use for talking or signaling purposes, or while another switch is in operation.

36. An automatic telephone system comprising lines, a plurality of switches, each switch having a bank of terminals in which each of said lines terminates, a switch-operating machine common to all of said switches, and clutch mechanism through the medium of which said machine may be employed for mechanically operating any one of said switches independently of the others, to select and close connection to an automatically selected line.

37. An automatic telephone system comprising a plurality of switches, a switch-operating machine, normally-open means of communication between the said machine and the said switches, subscriber-controlled electro-magnetic means for opening and closing said means of communication, thereby permitting said machine to be employed for causing the desired automatic trunk-selecting and connecting operation of any one of said switches independently of the others, each switch provided with a bank of trunk-line terminals, and said machine adapted to operate one or more switches at a time, whereby said machine, after causing the trunk-connecting operation of one of said switches, is instantly disconnected therefrom and put in condition for use in operating other switches while the said operated switch remains in use for either talking or signaling purposes, or while another switch is in operation.

38. A step-by-step selective switching apparatus comprising a plurality of trunk-selecting switches, a switch-operating machine common to all of said switches, adapted to cause said switches to automatically select idle trunks, and means for employing the said machine to effect the operation of any one of said switches independently of the others, each switch provided with a bank of trunk-line terminals, and said machine adapted to operate one or more switches at a time, whereby one subscriber does not wait for another to cease using the machine.

39. A switching apparatus comprising a plurality of normally at rest trunk-selecting switches, an operating shaft, normally at rest, common to all of said switches, adapted for rotation to cause one or more switches to perform a trunk-selecting and connecting operation, means whereby said shaft may be employed for operating any one of said switches independently of the others, to close connection with an idle trunk without interfering with its use in operating other switches while the said operated switch remains in use for the desired purpose, or while another switch is in operation, and means for restoring said switches to normal.

40. An automatic telephone system comprising a plurality of normally at rest "individual-switches", an operating member, normally at rest, common to all of said switches, means whereby said member may be employed for operating any one of said switches independently of the others, without interfering with its use in operating other switches while the said operated switch remains in use for either talking or signaling purposes, or while another switch is in operation, and means for restoring said switches to normal.

41. An automatic telephone system comprising a plurality of normally at rest "individual-switches", an operating member, normally at rest, common to all of said switches, mechanical power-transmitting connections whereby said member may be used for operating any one of said switches independently of the others, without interfering with its use in operating other switches while the said operated switch remains in use for either talking or signaling purposes, or while another switch is in operation, and means for restoring said switches to normal.

42. An automatic telephone system comprising subscribers' lines, a switch for each line, a shaft common to all of said switches, each switch being provided with a gear-wheel, a corresponding number of gear-wheels slidingly mounted upon said shaft but adapted to rotate therewith, a step-by-step ratchet device for rotating said shaft, and electro-magnetic means for shifting the gear-wheels of the shaft into and out of engagement with the gear-wheels of the switches, whereby said shaft and ratchet device may be employed for operating any one of said switches independently of the others, and without interfering with the subsequent use of the said shaft and ratchet device for operating other switches while the said operated switch remains in use for either talking or signaling purposes, or while another switch is in operation.

43. A telephone system comprising an automatic trunk-selecting and connecting apparatus, subscriber-operated means for controlling said apparatus, and suitable means distinct from said apparatus, adapted for switching and connecting in accordance with all digits of the called number, said apparatus including a shaft or long member, suitable bearings for said shaft or long member, means for turning said shaft or long member in its bearings, and a plurality of switches distributed along said shaft or long member, adapted to be operated by the latter to select idle trunks, each switch provided with means for distinguishing between busy and idle trunks, whereby each switch always selects the first idle trunk.

44. A telephone system comprising an automatic trunk-selecting and connecting apparatus, sub-station devices for controlling said apparatus, and suitable means distinct from said apparatus, adapted for switching and connecting in accordance with the called number, after the preliminary trunking has been completed by said apparatus, said apparatus including a plurality of switches, a suitably actuated shaft for operating said switches, adapted to cause any switches connected therewith to partake of the movement thereof, said apparatus provided with automatic means for distinguishing between busy and idle trunks, and each switch adapted to be operated by said shaft until an idle trunk is selected.

45. A telephone system comprising a normally at rest shaft, a suitable number of trunks, a plurality of switches distributed along said shaft, adapted to be operated thereby to select a trunk, subscriber-controlled means for opening and closing mechanical engagement or connection between said shaft and switches, and suitable subscriber-controlled means for operating said shaft, provided with a current interrupter, said apparatus having suitable means for distinguishing between busy and idle trunks, adapted to cooperate with said interrupter in automatically selecting idle trunks for calling subscribers.

46. A telephone system comprising a group of subscribers' telephone lines, a group of trunking connections less in number than said lines, an automatic trunk-selecting and connecting apparatus allotted to said lines, and suitable devices for making connections in accordance with the called number, adapted automatically to be brought into connection with a calling line by said apparatus, through the medium of a trunking connection, said apparatus including a suitable electro-magnet for each subscriber's line, line terminals for said lines, controlled by said electro-magnets, a bank or individual row of trunking connection terminals allotted to each subscriber's line, means common to all of said lines, adapted for use by any calling subscriber in closing connection between his line terminal and a trunking terminal, and automatic means for skipping busy trunks when a selection is to be made.

47. A telephone system comprising a group of subscribers' telephone lines, a group of trunk-lines less in number than said telephone lines, a trunk-selecting and connecting apparatus allotted to said telephone lines, suitable means distinct from said apparatus, adapted for making connections in accordance with the called number, after the preliminary trunking has been accomplished by said apparatus, and sub-station devices for controlling said apparatus, the said trunk-selecting and connecting apparatus including a plurality of switches for directly connecting the telephone lines with the trunk-lines, a normally at rest machine or mechanism common to all of said switches, adapted for use by any calling subscriber in operating one of said switches, to secure connection with a trunk-line, individual line-relays for said telephone lines, adapted to control said machine or mechanism, said apparatus provided with means for distinguishing between idle and busy trunk-lines, whereby a calling subscriber always gets an idle trunk-line.

48. A telephone system comprising a plurality of switches, a single propelling magnet common to all of said switches, means for mechanically connecting the switches with said propelling magnet and disconnecting the same therefrom, a current interrupter operated by said magnet, a bank of terminals for each switch, and means for distinguishing between busy and idle terminals, adapted to cooperate with said interrupter and magnet in selecting idle terminals.

49. A telephone system comprising a plurality of normally at rest switches, a common source of motion for said switches, subscribers' individual mechanical power-transmitting connections between said switches and source of motion, and a magnet for each switch, each magnet adapted to control said source of motion and operate its allotted mechanical connection.

50. A telephone system comprising a group of telephone lines, a line-relay for each line, a group of trunk-lines less in number than said telephone lines, a plurality of switches for connecting the telephone lines with said trunk-lines, a normally at rest mechanism or means for operating said switches, controlled by said relays, adapted for use by each calling subscriber in selecting an idle trunk-line, means for distinguishing between idle and busy trunk-lines, and sub-station devices for controlling the energizing of said relays.

51. A telephone system comprising trunks, a normally at rest shaft, a plurality of trunk-selecting switches distributed along said shaft, adapted to be operated thereby to select idle trunks, means for operating said shaft, means for distinguishing between idle and busy trunks, adapted to cause said switches to skip busy trunks and stop on the first idle trunk, and means for connecting in accordance with the called number, adapted to operate subsequent to the connection with an idle trunk.

52. A telephone system comprising trunks, a common operating means, subscribers' normally at rest individual trunking switches each provided with means for controlling the common operating means, and means for restoring said switches to normal.

53. A telephone system comprising a group of subscribers' lines, trunk lines less in number than said subscribers' lines, an individual trunking switch for each subscriber's line, a master switch common to and adapted for operating all of said individual switches to cause the latter to automatically select idle trunk lines, and an automatic switch at the end of each trunk line.

54. A telephone system comprising subscribers' lines, trunk lines, individual trunking switches for said subscribers' lines, a master switch common to and adapted for operating all of said individual switches to cause the latter to automatically select idle trunk lines, an automatic switch at the end of each trunk line, and trunk-release circuits for said individual switches, each trunk-release circuit controlled at one of said automatic switches.

55. A telephone system comprising subscribers' lines, three-wire trunk lines, individual trunking switches for said subscribers' lines, a master switch common to and adapted for operating all of said switches to cause the latter to automatically select idle trunk lines, an automatic switch at the end of each trunk line, and trunk-release circuits for said individual switches, each trunk-release circuit including the third wire of a trunk line and being controlled at the corresponding automatic switch.

56. A telephone system comprising subscribers' lines, trunk lines, individual trunking switches for said subscribers' lines, a long shaft or rotatable member common to and adapted for operating all of said individual switches, and a master switch for operating said shaft or rotatable member and causing said individual switches to automatically select idle trunk lines.

57. A telephone system comprising subscribers' lines, three-wire trunk lines, individual trunking switches for said subscribers' lines, a master switch for controlling the operations of said individual switches to cause the latter to automatically select idle trunk lines, and trunk-release circuits for said individual switches, each release circuit including the third wire of a trunk line.

58. A telephone system comprising a subscriber's line, trunk lines, a bank of trunk terminals and a movable switch wiper allotted to the subscriber's line, a relay for the subscriber's line, an energizing circuit for said relay, a normally closed switch point between the subscriber's line and one of said wipers, said switch point controlled by said relay, and said energizing circuit including said switch point and normally connected wiper, one or more additional individual switches each provided with line wipers, and a master switch controlling the operations of all of said individual switches, to cause the latter to automatically select idle trunk lines.

59. A telephone system comprising subscribers' lines, and automatic means for trunking calling lines into connection with called lines, said automatic means comprising automatic connectors less in number than said subscribers' lines, subscribers' individual switches arranged in groups, and a master switch for each group of individual switches.

60. A telephone system comprising subscribers' lines, and subscriber-controlled means for trunking calling lines into connection with called lines, said means including connectors less in number than the subscribers' lines, automatic trunking switches arranged in groups, and a master switch for each group of trunking switches.

61. A telephone system comprising subscribers' lines, subscriber-controlled means for trunking calling lines into connection with called lines, all normally at rest, said means including connectors less in number than the subscribers' lines, automatic trunking switches arranged in groups intermediate the calling lines and the connectors, and a switch-operating machine for each group of trunking switches.

62. A telephone system comprising a group of trunks, a plurality of automatic trunk selectors, and a step-by-step operating mechanism common to all of said trunk selectors, each trunk selector comprising means within itself for automatically selecting idle trunks.

63. In a telephone system, a plurality of automatic trunk-selecting switches, a shaft common to said switches for actuating the same to connect with idle trunks by forward rotation thereof, and means for restoring each switch to normal, after it is through using the trunk, by backward rotation thereof.

64. In a telephone system, trunk lines divided into groups, a plurality of switches, an operating member common to said switches for mechanically operating the same, and means including first selectors for extending connection from the said switches to the lines of called subscribers, said selectors having vertical motion to select groups and then rotary motion to find an idle trunk in the predetermined group.

65. In a telephone system, a plurality of subscribers' lines, a group of trunk lines, an automatic switch individual to each subscriber's line for selecting an idle trunk, and a master switch for controlling a group of individual switches.

66. In a telephone system, a plurality of subscribers' lines, a plurality of trunk lines, a non-numerical switch individual to each subscriber's line for selecting an idle trunk, and a master switch for controlling the operation of a group of individual switches.

67. In a telephone system, a plurality of subscribers' lines, a plurality of trunk lines, an automatic switch individual to each subscriber's line for selecting an idle trunk, and means for operating said switch by an initial impulse transmitted upon the removal of the receiver from the hook by the calling subscriber.

68. In a telephone system, a plurality of subscribers' lines, a plurality of trunk lines, a non-numerical switch individual to each subscriber's line for selecting an idle trunk, and means for operating said switch by an initial impulse transmitted upon the removal of the receiver from the hook by the calling subscriber.

69. In a telephone system, a plurality of subscribers' lines, means including a non-numerical switch and a numerical switch for establishing a connection between a calling and a called subscriber's line, a calling device at the substation for controlling the operation of said numerical switch, and means for controlling the operation of said non-numerical switch from the calling substation prior to the initial operation of said calling device.

70. In a telephone system, a subscriber's line, an automatic trunk-selecting switch individual thereto, a line relay therefor, and common means in said switch for both opening the line relay circuit and for connecting and disconnecting the line and the line wipers when the switch makes a call.

71. In a telephone system, a subscriber's line, an automatic trunk-selecting switch individual thereto, a line relay for said switch, and electro-magnetically operated means for opening the line relay circuit and for connecting and disconnecting the line and the line wipers when the switch makes a call.

72. In a telephone system, a subscriber's line, an automatic trunk-selecting switch individual thereto, a combined line relay and cut-off relay bridged across the line, and means controlled by said relay for opening the line relay circuit and for connecting and disconnecting the line and the line wipers when the switch makes a call.

73. In a telephone system, a subscriber's line, an automatic trunk-selecting switch therefor, a line relay for said switch, a cut-off magnet, said relay and magnet having a common core, means for energizing said magnet, and means whereby said energization opens the line relay circuit and disconnects the line from the line wipers of the switch.

74. In a telephone system, a subscriber's line, an automatic trunk-selecting switch therefor, a combined line and cut-off relay for said switch, bridged across said line, and means for energizing said relay to open the line relay circuit and disconnect the line from the line wipers of the switch.

75. In a telephone system, a plurality of subscribers' lines, a plurality of two conductor trunk lines, an automatic switch individual to each subscriber's line having means for simultaneously selecting both conductors of an idle trunk, and means for operating one of said switches by an initial impulse when the subscriber on the associated line starts to make a call.

76. In a telephone system, a plurality of subscribers' lines, a plurality of two conductor trunk lines, a non-numerical switch individual to each subscriber's line having means for simultaneously selecting both conductors of an idle trunk, and means for operating one of said switches by an initial impulse transmitted when the subscriber on the associated line starts to make a call.

77. In a telephone system, a group of trunks, a group of switches normally at rest adapted to select one of said trunks, and an operating mechanism normally at rest and common to said switches.

78. In a telephone system, a plurality of trunks, a plurality of switches normally at rest adapted to connect with one of said trunks, a shaft normally at rest and common to said switches, and means for operating said shaft to cause one of said switches to connect with one of said trunks.

79. A telephone system, a group of trunks, a group of non-numerical switches normally at rest adapted to select one of said trunks, and an operating mechanism normally at rest and common to said switches.

80. In a telephone system, a plurality of trunks, a plurality of non-numerical switches normally at rest adapted to connect with one of said trunks, a shaft normally at rest and common to said switches, and means for operating said shaft to cause one of said switches to connect with one of said trunks.

81. In a telephone system, a plurality of lines, a plurality of non-numerical switches, each having a bank of terminals, switch operating mechanism normally at rest and common to all of said switches, and means through the medium of which said mechanism may be employed for operating any one of said switches independently of the others to automatically select an idle line.

82. The combination with the stations of a telephone exchange, said stations divided into groups, and a less number of switches divided into corresponding groups, each switch of any one group being common for the use of any station of the same group but not usable by any of the stations in the other groups, means individual to one of said stations for automatically selecting an idle one of the switches in the corresponding group, and means also controlled from the station for moving the automatically selected switch so as to extend the connections to any of the other groups.

83. The combination with a series of groups of telephone stations, of a group of primary switches and a group of secondary switches apportioned to each group of stations, the primary switches being the same in number as the stations and each being of small capacity, while the secondary switches are of large capacity and are less in number than the stations, and means by which a primary and an automatically-selected one of the secondary switches cooperate in extending an electrical connection from a station in one group to a station in some other group.

84. The combination with a series of groups of telephone stations provided with mechanisms and connections for establishing telephonic connections between individual stations of different groups, of two groups of switches apportioned to the exclusive use of each group of stations, the first of said groups consisting of a series of small switches equal in number to the stations each switch of which is individual for the use of a different station and all of which have connections limited to the switches of the second group, and the second of said groups consisting of a series of large switches less in number than the stations each switch of which is common for the use of all stations of the group and all of which second switches have connections extending to the other groups of the exchange.

85. The combination with the stations of a telephone exchange, said stations being divided into groups, of two groups of switches apportioned to the exclusive use of the stations of each group, the switches of one of said groups being each individual for the use of a different station, and the switches of the other group being less in number and each being common for the use of all stations of the corresponding group of stations, and means by which upon an operation of an individual switch an idle one of the common switches is made temporarily individual for the use of the station associated with the operated individual switch.

86. In a telephone system, lines, non-numerical trunking switches associated with said lines, a common mechanism for controlling said switches, said mechanism being normally at rest.

87. In a telephone system, a plurality of lines, a non-numerical trunk selecting mechanism associated with said lines comprising automatic means for connecting a line with an idle trunk, and a common mechanism for controlling said means, said common mechanism provided with automatic means for selecting an idle trunk for said lines.

88. In a telephone exchange having a plurality of kinds of switches each kind of which is divided into an equal number of groups, the combination with the stations of the exchange, and conductors through which telephonic connections are completed between any two stations, of a large number of line switches in each group, each line switch serving as a primary switch and being limited in the range of its connections to the number of secondary switches in the corresponding group, a comparatively small number of intermediate switches in each group of such switches, each intermediate switch serving as a secondary switch and being capable of making connections to the final switches in a plurality of groups of final switches, and a comparatively small number of final switches in each group, each final switch being capable of making connections to all of the line switches of the corresponding group but incapable of making connections to line switches outside of the corresponding group.

89. The combination with the station of a telephone exchange, and conductors through which telephonic connections are established between any two stations, of a plurality of kinds of switches, all kinds of which are divided into corresponding groups and each kind of which is movable to connection with one of the other kinds, means by which the first and last kinds are limited in their possible connections to switches of corresponding groups, and means by which the intermediate kind serve to interconnect non-corresponding groups with each other.

90. In an automatic telephone station having its stations and its switching mechanisms divided into groups, the combination with the stations of one of such groups, of a group of line switches each of which is individual for a connected station, a less numerous group of secondary or intermediate switches individual as a group for the corresponding group of stations but individually common for all of the stations of the group, means for operating a line switch from its station so as to automatically select an idle one of said intermediate switches, as many groups of final switches as there are groups of stations, means for operating the selected intermediate switch so as to automatically select an idle final switch in any desired one of the groups of final switches, and means for operating the selected final switch so as to select any desired station in the corresponding group of stations.

91. The combination with a series of groups of telephone stations, of an equally numerous group of small automatically operating selective switches and a less numerous group of large switches apportioned to the exclusive use of each group of stations, other switches arranged in groups and common for the use of stations in all groups, and means operating through one of the small switches and an automatically selected one of the large switches for selecting one of the said other switches whereby connections may be made from a station in one group to a desired station in some other group.

92. In an automatic telephone exchange, the combination with the stations of the exchange divided into groups when considered as called stations, a series of station selecting switches less in number than the stations, and connections from said switches to said stations so arranged that a plurality of switches forming a group serve to complete telephonic connections to the station of a group of stations, of a line switch for each station, each line switch being provided with a small number of connections through which it may select an idle larger switch for use by a subscriber at the station associated with the line switch, a series of such larger switches, each common for the use of all of the stations constituting a group, and means by which such selected larger switch may be used to select an idle station selecting switch in a desired group of such switches.

93. The combination with the stations of a telephone exchange, said stations being divided into groups, of two groups of switches apportioned to the exclusive use of the stations of each group so that no station of any one group can use any of the switches of either of the groups of switches belonging to other groups of stations, the switches of the first of said two groups being equal in number to the stations of the corresponding group and each switch being individual for a different station, the switches of the second of the said two groups being less in number than the stations and each switch being common for the use of all of the stations of the corresponding groups, a third and corresponding plurality of groups of switches to which connections are made by the second groups, and means for operating said switches so as to complete electrical connections between any station of any group and any station of any of the other groups.

94. In an automatic telephone exchange having its subscribers divided into groups by hundreds, a group of primary switches termed line switches and a group of secondary switches termed intermediate switches all located for the exclusive use of each group of subscribers, the secondary switches being a percentage of the primary switches and the primary switches having contacts which are a percentage of the contacts of the secondary switches, connections from each subscriber's station to a different primary switch, means controlled by each subscriber for causing his primary switch to automatically extend the connections of his station to an idle one of the secondary switches, other switches serving as station selecting switches for different groups of subscribers, and means by which a subscriber having obtained possession of an idle secondary switch may operate such switch to cause the automatic selection of an idle one of the station selecting switches.

95. In a telephone exchange system, the combination with a group of normally open substation lines, of a group of automatic selectors, an automatic distributor for each line adapted when set in operation to test said selectors and make connection with an idle selector, means controlled by the operation of the receiver hook switch of a line for setting its individual distributor in operation to secure a selector and transmitter mechanism adapted to govern the operation of the selector secured.

96. In an automatic telephone system, a central office, a metallic circuit line leading therefrom to a substation, selecting switches at the central station, a switch actuated by taking up the receiver at the substation to connect the normally disconnected line with an idle selecting switch, and means controlled at the substation to actuate the selecting switch connected with said line.

97. In an automatic telephone system, a central office, a metallic circuit line leading therefrom to a subscriber's substation, a plurality of selecting switches, an individual switch for each line, trunk lines interconnecting said individual switch and said selecting switches, and means automatically controlled by taking up the receiver at the substation to actuate said individual selecting switch to connect the calling line with an idle trunk line.

98. In an automatic telephone system, a plurality of metallic circuit telephone lines, an individual switch for each of said lines, a plurality of secondary selecting switches, trunk lines for connecting said secondary selecting switches with subscribers' lines, mechanism actuated upon the removal of the receiver from the hook at a substation automatically to connect the switch arm of said individual switch with one of said secondary switches, and means controlled at the subscriber's substation for actuating a secondary selecting switch after connection with a calling line.

99. In an automatic telephone system, a metallic circuit telephone line extending from a subscriber's substation to a central office, selecting switch individual to said telephone line, secondary selecting switches and trunk lines interconnecting said individual switch and said selecting switches, and means whereby a single impulse sent over the line by the actuation of the substation switchhook may cause the actuation of said individual switch to connect the calling line with an individual trunk line.

100. In a telephone system, the combination with a telephone line of a line switch therefor individual to the line, a motor magnet for said line switch, a contact in circuit with the motor magnet and operated by the energization of the motor magnet, and means to complete a circuit through said motor magnet, and contacts for the operation of said line switch, substantially as described.

101. An automatic trunk-selecting switch comprising an actuating or propelling magnet, a line relay controlling the energizing of said magnet, means including a line circuit conductor for suitably energizing said relay, a local circuit controlled by the relay for energizing the same, and means operated by the said magnet for opening the local circuit to stop the switch on an idle trunk terminal.

102. An automatic trunk-selecting switch comprising a line relay, means including a line circuit conductor for energizing the said relay, and means including normally closed springs of said relay for establishing a guarding potential for any trunk terminal selected by the switch.

103. An automatic trunk-selecting switch comprising a line relay, means including a line circuit conductor for energizing said relay, and means for establishing a guarding potential for any selected trunk terminal by the de-energizing of said relay.

104. An automatic trunk-selecting switch comprising a wiper, a line relay, means including a line circuit conductor for energizing said relay, and a circuit closed by the energizing of said relay and including a winding thereof in series with the said wiper.

105. An automatic trunk-selecting switch comprising a line relay, means including a line circuit conductor for energizing said relay, and means including a local circuit for keeping said relay energized to keep the switch in operation until an idle trunk terminal is found.

106. An automatic trunk-selecting switch comprising line terminals, wipers normally connected with the said terminals, a relay for disconnecting the wipers from the terminals, and a source of electrical current and connections therefrom for operating purposes.

107. In combination, a plurality of electrical transmission lines having different busy and idle conditions and provided with line terminals, a selector switch adapted to connect said lines to another circuit, means for actuating said switch to move from a given normal position successively over the transmission line terminals, and means governed by the condition of any line automatically stopping the movement of said selector switch when an idle line is reached, said means including a self-locking controlling relay having its locking circuit completed through the transmission line test terminals, and dependent upon the condition thereof.

108. In combination, a plurality of electrical transmission lines having different busy and idle conditions, a selector switch adapted to connect said lines to another circuit, means for actuating said selector switch to move from a given normal position successively over the transmission line terminals, and a testing relay governed by the condition of any line and acting to stop the movement of said selector switch when an idle line is reached, said relay after initial energization locking itself through line test terminals.

109. In automatic switching apparatus selector switches containing multiple test terminals, means for maintaining test potential on terminals that are busy, and a test relay for each switch adapted upon initial energization to connect itself to the test wiper of the switch through a circuit controlled by itself exclusively.

110. In combination, a telephone line, a switch associated therewith, terminals of said line at said switch, other terminals for engagement with said line terminals, a shaft capable of movement in two directions whereby said line terminals may be engaged with said other terminals, and independent means for retaining said terminals in engagement.

111. In a telephone system, a subscriber's line, an automatic switch associated with said line, a second subscriber's line, means for establishing connection from said first to said second subscriber's line, or from said second line to said first line, operating means for said switch bridged across the line and a magnet for disconnecting said operating means from across the line when said first line is calling, said magnet also for disconnecting said operating means from across the line when said first line is called.

112. In a telephone system, a subscriber's line, an automatic subscriber controlled switch individual to said line, means including said switch for extending said line when calling, means for connecting with said line as a called line, a line relay for said switch normally connected in bridge of said line, a magnet for disconnecting said line relay, and means for energizing said magnet whenever said line is calling or is being called.

113. In a telephone system, a subscriber's line, a non-numerical automatic subscriber controlled switch individual to said line, means including said switch for extending said line when calling, means for connecting with said line as a called line, a line relay for said switch normally connected in bridge of said line, a magnet for disconnecting said line relay, and means for energizing said magnet whenever said line is calling or is being called.

114. In a telephone system, a subscriber's line, an automatic subscriber controlled switch individual to said line, means including said switch for extending said line when calling, means for connecting with said line as a called line, a line relay for said switch normally connected in bridge of said line, the said bridge including the wipers of said switch in normal position, a magnet for disconnecting said line relay, and means for energizing said magnet whenever said line is calling or is being called.

115. In a telephone system, a subscriber's line, an automatic switch associated with said line, a second subscriber's line, means including said switch for extending a connection from said first line to said second line, other automatic subscriber controlled switching mechanism including a final connector switch having direct access to said first line for extending a connection from said second line to said first line, a line relay individual to said first line and normally connected in bridge of the same, a magnet for disconnecting said line relay, and means for energizing said magnet whenever said first line is calling or is being called.

116. In a telephone system, automatic switches having vertical and rotary motion for selecting an idle trunk in accordance with the first digit of any called number, subscribers' automatic line switches arranged in groups and provided with means for selecting idle trunks leading to said first-mentioned automatic switches, and a master switch for each group of subscribers' line switches.

117. In a telephone system, a longitudinal shaft normally at rest, a plurality of switch wipers, means for operatively connecting any one of said wipers with said shaft, and a magnet individual to each wiper for controlling a circuit through said wiper.

118. In a telephone system, a longitudinal shaft normally at rest, a plurality of switch wipers, means for operatively connecting any one of said wipers with said shaft, means for automatically disconnecting the selected wiper from said shaft when the same has been operated, and a magnet individual to each wiper for controlling a circuit through said wiper.

119. In a telephone system, a longitudinal step by step shaft, a plurality of switch wipers, means for operatively connecting any one of said wipers with said shaft, means for propelling said shaft, and a magnet individual to each of said wipers for controlling a circuit therethrough.

120. In a telephone system, a longitudinal step by step shaft, a plurality of switch wipers, means for operatively connecting any one of said wipers with said shaft, means for automatically disconnecting the selected wiper from said shaft when the same has been operated, and means for propelling said shaft.

121. An automatic telephone system comprising an electrically-propelled and step-by-step-actuated switching machine provided with a release mechanism operated by a release-magnet, another switching machine of suitable character provided with a switch-shaft having a private-wiper, a battery for furnishing the necessary current, an energizing circuit for said magnet including said wiper on the shaft of the other machine, and a talking circuit independent of said wiper.

122. An automatic telephone system comprising a selector provided with release mechanism operated by a release-magnet, means for supplying all necessary current, a pair of line-relays provided with normally open switch-contacts, and an energizing circuit for said magnet including said contacts, whereby the said circuit has but one normally open switch-point, and another energizing circuit for said magnet.

123. An automatic telephone system comprising a selector provided with electrically-propelled and step-by-step switching means including a private-wiper, and with release mechanism operated by a release-magnet, a test magnet, a pair of normally open contacts adapted to be closed immediately upon the energizing of said test magnet, means for supplying all necessary current, and an energizing circuit for said test magnet, said circuit including said contacts and wiper.

124. In a telephone exchange system, the combination of a private-bank-contact, a private-wiper engaging said contact, a battery, a test-magnet provided with relay-springs, and means for connecting one pole of the battery with the private-wiper through the said relay-springs to establish a guarding potential at said private-bank-contact.

125. In a telephone exchange system, a private-wiper, a test-magnet, a battery, a circuit for energizing said test-magnet, said circuit including the private-wiper and the battery, a private-bank-contact engaged by the wiper, and a connection for establishing a guarding potential through the private-wiper to the said private-bank-contact, said test-magnet provided with relay-springs controlling said circuit and connection, whereby the guarding potential is established when the said magnet is deenergized.

126. In a telephone system, a talking circuit, means including a rotary switch for establishing said talking circuit, a relay having contact springs for directly controlling said circuit, means for energizing said relay, and means by which the calling subscriber deenergizes said relay before the call reaches the called line for maintaining the continuity of the circuit for talking purposes.

Signed by me at Chicago, Cook County, Illinois, this 3rd day of March, 1905.

JOHN ERICKSON.